United States Patent
Katsurahira et al.

(10) Patent No.: US 8,373,683 B2
(45) Date of Patent: *Feb. 12, 2013

(54) POSITION INPUT DEVICE AND COMPUTER SYSTEM

(75) Inventors: Yuji Katsurahira, Kazo (JP); Masaki Matsubara, Meguro-ku (JP)

(73) Assignee: WACOM Co., Ltd, Saitama-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/347,154

(22) Filed: Jan. 10, 2012

(65) Prior Publication Data

US 2012/0127132 A1 May 24, 2012

Related U.S. Application Data

(60) Continuation of application No. 12/787,920, filed on May 26, 2010, now Pat. No. 8,094,140, which is a division of application No. 11/637,220, filed on Dec. 12, 2006, now abandoned.

(30) Foreign Application Priority Data

Dec. 12, 2005 (JP) .................. P2005-357965
Mar. 16, 2006 (JP) .................. P2006-073102

(51) Int. Cl.
*G06F 3/033* (2006.01)
(52) U.S. Cl. .............. 345/179; 345/156; 178/19.03; 178/19.01
(58) Field of Classification Search .......... 345/173, 345/179; 178/19.01–20.01
See application file for complete search history.

(56) References Cited

U.S. PATENT DOCUMENTS

| | | | |
|---|---|---|---|
| 4,697,050 A * | 9/1987 | Farel et al. ............. | 178/19.07 |
| 6,628,271 B1 | 9/2003 | Matsumoto et al. | |
| 6,633,155 B1 | 10/2003 | Liang | |
| 6,744,426 B1 * | 6/2004 | Okamoto et al. ........ | 345/179 |
| 6,999,067 B2 * | 2/2006 | Chao et al. ............. | 345/179 |
| 8,094,140 B2 * | 1/2012 | Katsurahira et al. ..... | 345/179 |
| 2005/0078432 A1* | 4/2005 | Gallay et al. ........... | 361/301.3 |

FOREIGN PATENT DOCUMENTS

| | | |
|---|---|---|
| EP | 1513241 A1 | 3/2005 |
| JP | 3-183321 A | 8/1991 |
| WO | 2006/059336 A2 | 6/2006 |

* cited by examiner

*Primary Examiner* — Amare Mengistu
*Assistant Examiner* — Dmitriy Bolotin
(74) *Attorney, Agent, or Firm* — Berenato & White, LLC

(57) ABSTRACT

A position input device is provided in which signals are transmitted from a position indicator, and signals transmitted from the position indicator are received by a position detector device. According to certain embodiments, an electrical double-layer capacitor, a charging circuit which charges the electrical double-layer capacitor, and a power transmission unit which relays and supplies to the charging circuit power supplied from a power supply unit external to the position indicator, are provided in the position indicator. In other embodiments the position input device has a built-in power supply unit, transmitting units, and a control unit for switching the transmitting units between energized and de-energized states. Also provided are position input systems and computer systems including the position input device, and methods of operating the position input device and the systems.

34 Claims, 19 Drawing Sheets

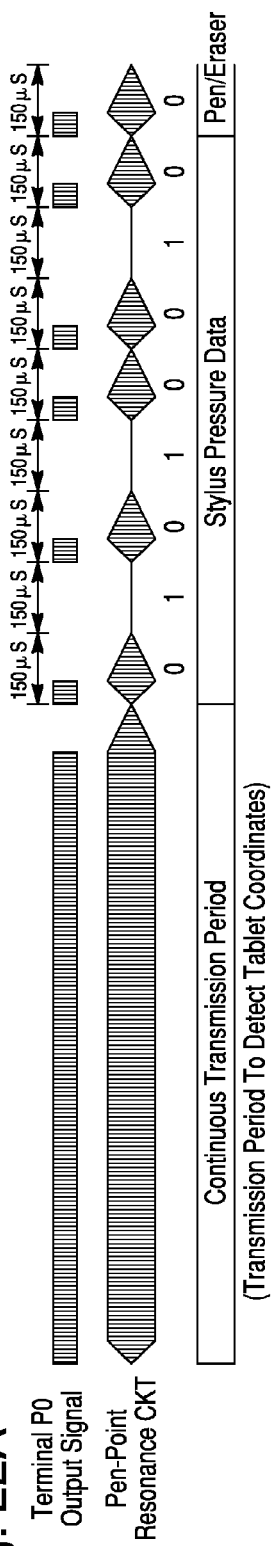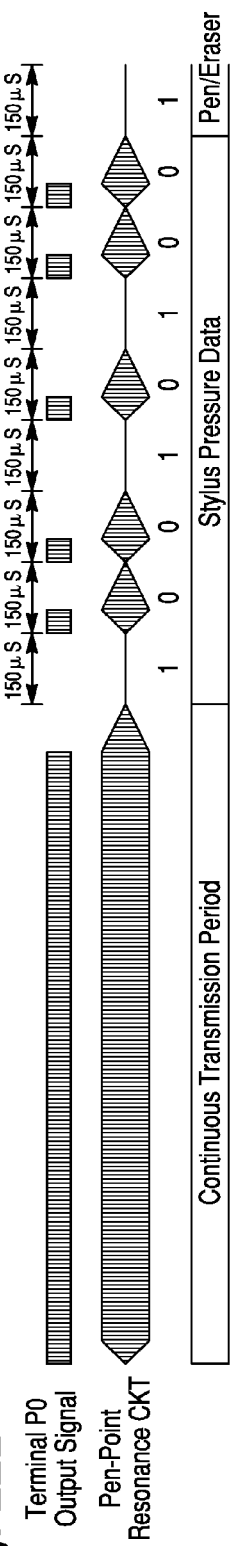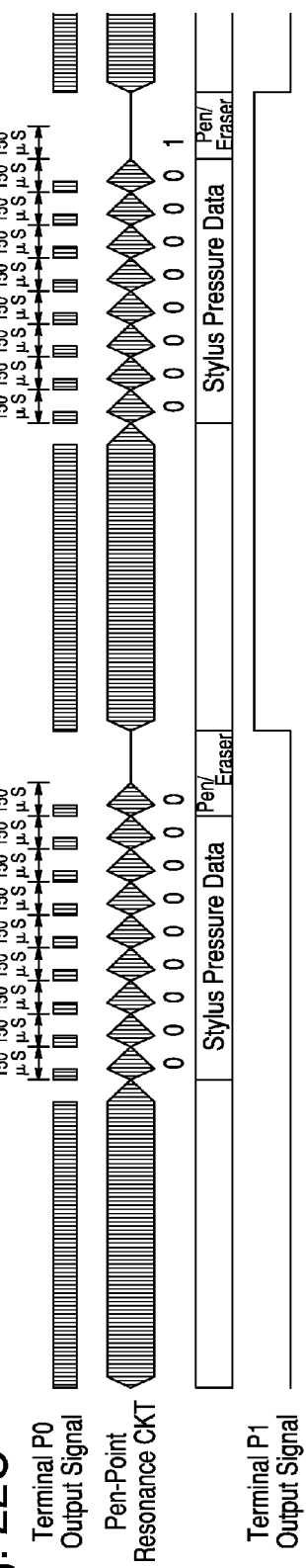

Hand Not Near Electrode

Hand Near Electrode

POSITION INPUT DEVICE AND COMPUTER SYSTEM

CROSS-REFERENCES TO RELATED APPLICATIONS AND CLAIM TO PRIORITY

The present application is a continuation of application Ser. No. 12/787,920, filed on May 26, 2010, now U.S. Pat No. 8,094,140, which is a divisional of application Ser. No. 11/637,220, filed Dec. 12, 2006 now abandoned, the disclosures of which are incorporated herein by reference and to which priority is claimed. The present application also claims the benefit of Japanese Application No. P2005-357965, filed on Dec. 12, 2005, which application is incorporated herein by reference and to which priority is claimed.

The present application also claims the benefit of Japanese Application No. P2006-073102 filed on Mar. 16, 2006, which application is incorporated hereby by reference and to which priority is claimed.

FIELD OF THE INVENTION

Aspects of this invention relate to a battery-free position pointing device (also referred to herein as a position indicator), a position input system, and a computer system which detect position by transmitting and receiving signals between the position indicator and the position detection device, and to related methods.

Additional aspects of the present invention relate to a position pointing device with a built-in power source, a position input system, and a computer system suitable for use in detecting position, preferably by electromagnetic induction, and preferably in a manner in which the service life of the built-in power supply of the position pointing device is prolonged.

BACKGROUND OF THE INVENTION

Position input systems, also known as pen tablets or tablet/digitizers, have seen widespread use as input devices for computers, for example. The position input system generally comprises a pen-type or stylus-type position indicator (also referred to herein as a position pointing device) for indicating a position on a tablet, and a position detection device. In such a position input system signals transmitted from the position indicator are received by the position detection device to detect the position on the tablet indicated by the position indicator. So far various technologies have been developed for detecting the position designated on the tablet. Of these various kinds of developed technologies, an electromagnetic induction system position detecting apparatus like the invention described in Japanese Published Patent Application No. 2-53805 is known for detecting the position designated on the tablet.

In recent years, position input systems have appeared which are integrated with a liquid crystal display device, and which enable operation of the position indicator on a display screen. Generally in such a position input system, electric waves are transmitted to the position indicator from the position detector device integrated with the display screen, and these electric waves are utilized to transmit signals from the position indicator. In such a position input system, because the signals transmitted from the position indicator to the position detection device are comparatively weak, the sensitivity and precision of the position detector device may be reduced in an environment of intense electromagnetic noise, such as may be generated by the liquid crystal display device or other sources. As a countermeasure, the signals transmitted from the position detector device may be strengthened. However, strengthening of the signals is problematic inasmuch as power consumption by the position detector device is increased.

It has been proposed to incorporate a battery into the position indicator, so that the transmission of signals from the position detector device becomes unnecessary. Using such a method, strong signals can be transmitted from the position indicator with low power consumption.

However, the use of batteries can also raise problems. In the case of the above-described position indicator, replacing the battery is time consuming and troublesome. Also, if the intensity of signals transmitted from the position indicator is to be increased, power consumption is increased and battery depletion occurs in a short length of time, so that the batteries built into the position indicator may need to be replaced frequently, causing further inconvenience. In addition, the weight of a position indicator incorporating a battery is increased significantly, and there is the further problem that operating properties are severely degraded.

Recently, it has been known to provide position pointing devices with tuning circuits at both ends of their pen-like bodies. The tuning circuit at the first end is able to transmit written information, and the tuning circuit at the other or second end is able to transmit other information, such as the erasing of information. See Japanese Published Patent Application No. 8-96350. It has been proposed to provide such position pointing devices with built-in power supply units and oscillation units to increase the magnitude of transmission output, and thereby improve accuracy in detecting position. See Japanese Published Patent Application No. 10-214148.

However, if a position pointing device possesses a built-in power supply unit (i.e., a battery) and a plurality of oscillation units instead of the above-discussed tuning circuits, then power consumption of the built-in power supply unit is increased by a multiple equal to the number of oscillation units in the position pointing device, e.g., if the position pointing device contains two oscillation units, then power consumption is doubled. Accordingly, the time period during which the position pointing device may be operated prior to consumption of all of the power in the built-in power supply is lessened correspondingly. As a result, the battery must be replaced or recharged more frequently, inconveniencing the operator.

SUMMARY OF THE INVENTION

Aspects of this invention were devised in light of the above circumstances, and certain aspects have as an object the provision of a position indicator device capable of stable position detection without readily being affected by external noise even under low power consumption, which is lightweight, and which does not require battery replacement. It is another object of the invention to provide a position input system and a computer system to which this position indicator device is applied.

A first aspect of the invention provides a position input system comprising a position indicator for transmitting signals and a position detector device for receiving the signals transmitted from the position indicator. The position indicator comprises an electrical double-layer capacitor, a charging circuit to charge the electrical double-layer capacitor, and a power transmission unit to relay and supply the charging circuit with power supplied from a power supply unit external to the position indicator.

According to a preferred implementation of this first aspect of the invention, signals can be transmitted using an electrical double-layer capacitor provided in the position indicator, so that there is greater freedom with respect to power consumption for signal transmission. For example, compared with a case in which signals are transmitted to the position indicator from the position detector device, according to this implementation of the first aspect of the invention signals transmitted from the position indicator can be more reliably detected by the position detector device even at extremely low power consumption, thus permitting power consumption by the position detector device to be greatly reduced. As a result, signals are transmitted reliably from the position indicator to the position detector device with low power consumption and without easily being affected by external noise. Further, strong signals can be reliably received within the position detector device, so that the position indicated by the position indicator can be detected.

Further, by using an electrical double-layer capacitor, short-duration charging is possible, and a position indicator with the advantages of light weight and compactness can be realized. That is, the position indicator of the position input system of this aspect of the invention differs from a position indicator incorporating a primary battery in that troublesome and time-consuming battery replacement is not required. Further, because charging is possible in an extremely short time, there is little inconvenience arising from an inability to use the position indicator until charging is complete. The light weight of the position indicator also affords excellent operating properties.

According to another implementation of this first aspect of the invention, the position input system further comprises an external power supply unit. The inclusion of the external power supply unit provides various benefits, such as the simplification of charging of the electrical double-layer capacitor, and enhancement of the usability of the system.

According to another implementation of this first aspect of the invention, a coil is provided in the position indicator, and an AC magnetic field generation unit is provided as the power supply unit. In this case, by using the AC magnetic field generation unit to generate a magnetic field, an induced current flows in the coil, causing the electrical double-layer capacitor to be charged. Power can be supplied through this magnetic field without requiring contact, so that freedom of design of the position indicator is enhanced, and the durability of the position indicator and the power supply unit can be improved.

According to still another implementation of this first aspect of the invention, as the power supply unit, the AC magnetic field generation unit is provided in a stand in which the position indicator can be set. By setting the position indicator in the stand, the electrical double-layer capacitor can be charged, so that operation related to charging becomes extremely simple, and operability is improved.

According to yet another implementation of this first aspect of the invention, a power supply assistance unit for receiving power from the electrical double-layer capacitor and supplying a prescribed voltage to the position indicator is provided in the position indicator. The voltage across the terminals of the electrical double-layer capacitor is high immediately after charging, and is expected to decline as power is consumed. The power supply assistance unit preferably is operable to supply a prescribed voltage based on the power of the electrical double-layer capacitor, so that when various circuitry is incorporated into the position indicator, stable operation of the circuitry is assured.

According to a further implementation of this first aspect of the invention, the position detector device detects signals transmitted from the position indicator based on a static coupled state with the position indicator. Moreover, the position detector device may be a device which detects signals transmitted from the position indicator based on electromagnetic coupling with the position indicator. Further, the position indicator may employ a configuration comprising a resonance circuit comprising a coil and a capacitor.

According to still a further implementation of the first aspect of the invention, the position indicator comprises a voltage detection unit and an information transmission unit. The voltage detection unit detects when the voltage of the electrical double-layer capacitor has fallen to or below a prescribed voltage value. The information transmission unit transmits information indicating detection by the voltage detection unit of the fallen voltage to the position detector device. The transmission of this information allows the position detector device to automatically detect and notify the user of the need for charging.

It should be understood that the above implementations of the first aspect may be practiced in various combinations.

According to a second aspect of the invention, a computer system is provided. The computer system comprises a position input system, a display device for displaying screens, and a computer for processing information based on positions detected by the position input system. The position input device comprises a position indicator which transmits signals, and a position detector device which receives signals transmitted from the position indicator. The position indicator contains an electrical double-layer capacitor, a charging circuit for charging the electrical double-layer capacitor, and a power transmission unit for relaying and supplying the charging circuit with power supplied from a power supply unit external to the position indicator.

According to the second aspect of the invention, preferably signals can be transmitted using the electrical double-layer capacitor provided in the position indicator. As a consequence, power consumption for signal transmission is greatly reduced, and the position indicator may be operated without significant impediment from external noise. In this system, the time and trouble otherwise that would be involved in the replacement of a battery in the position indicator may be avoided. Moreover by using the electrical double-layer capacitor, the position indicator can be charged in an extremely short time. Further, the position indicator can be made lightweight, for excellent operability.

According to an implementation of the second aspect of the invention, the position indicator may further include a voltage detection unit which detects when the voltage of the electrical double-layer capacitor has fallen to or below a prescribed voltage value, and an information transmission unit which transmits to the position detector device information indicating detection by the voltage detection unit of the fallen voltage.

According to this implementation of the second aspect of this invention, the need to charge the position indicator may be detected in the position detector device when the voltage of the electrical double-layer capacitor in the position indicator has fallen below the prescribed voltage value, and the position indicator can be recharged.

According to another implementation of this second aspect of the invention, the computer system further comprises an AC magnetic field generation unit as the power supply unit, and a coil is provided in the position indicator. The computer is operable to use the position detector device to receive information transmitted by the information transmission unit provided in the position indicator. When, based on the information from the information transmission unit, it is determined that the electrical double-layer capacitor must or should be charged, current is supplied to the AC magnetic field generation unit.

In this implementation, current is supplied to the AC magnetic field generation unit which charges the electrical double-layer capacitor of the position indicator only when the information transmission unit reports the drop in the voltage of the electrical double-layer capacitor. Power consumption can be thereby rendered efficient by avoiding the unnecessary supply of current to the AC magnetic field generation unit, i.e., when the voltage of the electrical double-layer capacitor has not fallen. In addition, charging can be performed rapidly when necessary.

According to another implementation of this second aspect of the invention, the computer is operable to determine, based on information transmitted from the position indicator and received by the position detector device, whether the electrical double-layer capacitor must or should be charged, and to cause a report to be generated and displayed by the display device. The report may notify the user that the position indicator requires charging, so the user views the report and performs charging. Thus, the user can concentrate on operation of the device without paying special consideration to the timing of charging, for greater convenience to the user.

According to still another implementation of this second aspect of the invention, the computer system further comprises an AC magnetic field generation unit employed as the power supply unit, with a coil provided in the position indicator. The computer is operable to supply current to the AC magnetic field generation unit when a prescribed time has elapsed from the previous supply of current to the AC magnetic field generation unit. According to a preferred practice of this implementation, after the AC magnetic field generation unit is supplied with current, an estimated timing value is determined to anticipate a drop in the voltage of the electrical double-layer capacitor. Current is again supplied to the AC magnetic field generation unit upon expiration of the estimated timing value. In this manner, power consumption can be rendered efficient, without unnecessarily supplying unneeded current to the AC magnetic field generation unit. In addition, charging can be performed rapidly when necessary. Further, current can be supplied to the AC magnetic field generation unit with appropriate timing without performing complex processing, thereby enabling transition to the charged state.

According to yet another implementation, a configuration may be employed in which the computer system further comprises an AC magnetic field generation unit as the power supply unit, with a coil provided in the position indicator. According to this implementation, current is supplied to the AC magnetic field generation unit within a timing which anticipates a drop in the voltage of the electrical double-layer capacitor, without waiting for transmission of information from the position indicator. More specifically, the computer causes current to be supplied to the AC magnetic field generation unit during the interval before or when a prescribed time has elapsed from the previous supply of current to the AC magnetic field generation unit, even if the position detector device has not yet received information indicating detection of the voltage drop transmitted from the information transmission unit provided in the position indicator. Accordingly, charging can be performed rapidly when necessary, for example, even when for example the voltage across the electrical double-layer capacitor drops sharply and the above information cannot be transmitted to the position detector device.

According to additional implementations of this second aspect of the invention, the computer system comprises a prompt for notifying the operator to charge the electrical double-layer capacitor. The prompt may be located on the position indicator, position detector device, and/or the power transmission unit.

According to yet an additional implementation of the second aspect, the power supply unit is integrated on or into the position detector device to form a unitary piece.

It should be understood that the above implementations of the second aspect may be practiced in various combinations.

According to a third aspect of the invention, a method is provided for charging a position indicator of a position input system, which comprises a position indicator for transmitting signals and a position detector device for receiving signals transmitted by the position indicator. The position indicator includes an electrical double-layer capacitor, a charging circuit which charges the electrical double-layer capacitor, and a power transmission unit. Power is supplied from a power supply unit external to the position indicator, and the power transmission unit relays the power to the charging circuit.

A fourth aspect of the invention provides a method of operating a computer system. A position input system comprises a position indicator for transmitting signals, a position detector device for receiving signals transmitted from the position indicator is provided, and a computer for processing information based on positions detected by said position input system. Power is supplied from a power supply unit external to the position indicator, and the power transmission unit relays the power to the charging circuit.

According to an implementation of this fourth aspect of the invention, the method further comprises detecting when the voltage of the electrical double-layer capacitor has dropped to or below a prescribed voltage value, and transmitting to the position detector device information indicating detection of the voltage drop.

Advantageously, in preferred aspects and implementations of this invention described above, an electrical double-layer capacitor serves as a power storage of the position indicator, so that there is no need to supply power to the position indicator from the position detector device. Strong signals can be received from the position indicator by the position detector device with low power consumption and without easily being affected by external noise. Further, no time or trouble need be taken to replace batteries in the position indicator, and charging can be performed in an extremely short time. Moreover, the electrical double-layer capacitor is lighter than ordinary batteries while affording high capacity, so that the position indicator enjoys the advantages of light weight and excellent operability. As a result, a position input system comprising a position indicator with light weight and excellent operability, as well as a computer system comprising the position input system, can be realized.

Another object of the present invention is to provide a position pointing device having a built-in battery, a position input system comprising a position pointing device having a built-in battery and a position detecting apparatus, and a computer system possessing one or more of the following advantages: an efficient power consumption, even when a plurality of oscillation units is provided; and a lower frequency of operational disruptions (e.g., battery changes and recharges) than is encountered relative to conventional devices containing a built-in battery.

A fifth aspect of the invention is directed to a position pointing device for transmitting a positioning signal to a position detecting tablet. The position pointing device includes a built-in power supply unit, signal transmitting units provided at a plurality of portions of the position pointing device, and a control unit for switching the signal transmitting units between energized or de-energized states.

According to an exemplary implementation of this fifth aspect of the invention, the plurality of signal transmitting units includes first and second signal transmitting units respectively provided at opposite end portions of the position pointing device, preferably to transmit a pen-point signal and an eraser signal, respectively.

In another implementation of the position pointing device of the fifth aspect of the invention, the control unit alternately switches the signal transmitting units between the energized and de-energized states.

According to still another implementation of the fifth aspect of the invention, the position pointing device further includes a direction detecting unit for detecting the direction in which the position pointing device is arranged relative to the position detecting tablet. The control unit is operable to energize whichever of the signal transmission units faces the position detecting tablet based on a detected result of the direction detecting unit.

According to still another implementation of the position pointing device of the fifth aspect of the invention, the direction detecting unit is a stylus pressure detecting unit and the control unit is operable to energize whichever of the signal transmission units is determined to be in use based on detection by the stylus pressure detecting unit of a load greater than a predetermined load. At the same time, preferably the control unit de-energizes the signal transmission unit determined not to be in use.

In further implementation of the fifth aspect of the invention, the control unit is operable to sequentially operate the plurality of signal transmitting units if it is determined by the stylus pressure detecting unit that a load greater than the predetermined load is not detected from any one of the signal transmitting units.

In still a further implementation of the fifth aspect of the invention, the direction detecting unit is a touch-sensitive sensor and the control unit is operable to energize whichever of the signal transmission units is associated with an end of the position pointing device which touches the position detecting tablet. Preferably, the control unit de-energizes whichever of the signal transmission units is associated with an end of the position pointing device which does not touch the position detecting tablet.

It should be understood that the above implementations of the fifth aspect of the invention may be practiced in various combinations.

A sixth aspect of the invention is directed to a position pointing device for transmitting a positioning signal to a position detecting tablet. This position pointing device includes a built-in power supply unit, a plurality of signal transmitting units provided at a plurality of portions of the position pointing device, and a power control unit for switching magnitude of transmission power of said signal transmitting units between at least two levels.

In accordance with an implementation of the sixth aspect of the invention, first and second signal transmitting units of the plurality of signal transmitting units are respectively provided at opposite end portions of the position pointing device to transmit a pen-point signal and an eraser signal, respectively.

In the position pointing device according to another implementation of the sixth aspect of the invention, the position pointing device further includes a direction detecting unit for detecting the direction of the position pointing device relative to the position detecting tablet. The power control unit is operable to increase, based on a detected result of the direction detecting unit, a magnitude of transmission power from whichever of the signal transmitting units is located on a side of the position pointing device nearer to the position detecting tablet, so that the magnitude of transmission power from the signal transmitting unit located on the side nearer to the position detecting tablet is greater than the magnitude of transmission power from whichever of the signal transmitting units is on the opposite side of the position pointing device.

A seventh aspect of the invention is directed to a position input system including a position pointing device for transmitting positioning information signals. The position pointing device includes a built-in power supply unit, a plurality of signal transmitting units provided at a plurality of portions of the position pointing device, and a power control unit for controlling the transmission power of each of a plurality of signal transmitting units. The position input system further includes a position detecting tablet for receiving the positioning signals from the position pointing device. A discriminating unit discriminates the signals from the signal transmitting units.

In an exemplary implementation of the position input system of the seventh aspect of the invention, the discriminating unit is a first discriminating unit provided at a first end portion of the position pointing device to discriminate a pen-point signal, and the position input system further includes a second discriminating unit provided at a second end portion of the position pointing device for discriminating an eraser signal.

The eighth aspect of the present invention is directed to a computer system including a position pointing device for transmitting positioning signals. The position pointing device includes a built-in power supply unit, a plurality of signal transmitting units provided at a plurality of portions of the position pointing device, and a power control unit for controlling transmission power of each of a plurality of signal transmitting units. The computer system further includes a position detecting tablet for receiving positioning signals from the position pointing device. A discriminating unit discriminates the signals from a plurality of signal transmitting units. A computer is provided for processing the positioning information from the position pointing device and discrimination information from the discriminating unit.

In an exemplary implementation of the system of the eighth aspect of the invention, the discriminating unit is a first discriminating unit provided at a first end portion of the position pointing device to discriminate a pen-point signal, and the system further includes a second discriminating unit provided at a second end portion of the position pointing device for discriminating an eraser signal.

A ninth aspect of the invention provides a method for charging a position pointing device used for transmitting a positioning signal to a position detecting tablet. The position pointing device comprises a built-in power supply unit, a plurality of signal transmitting units provided at a plurality of portions of the position pointing device, and a control unit. The control unit switches the plurality of signal transmitting units between energized or de-energized states.

According to the position pointing device, the position detecting apparatus, the computer system, and method encompassed in the fifth to ninth aspects of the present invention, the position pointing device has a built-in power supply unit so that accuracy in detecting position can be improved.

Even when the position pointing device includes a plurality of oscillation circuits, power consumption by the position pointing device can be reduced. Also, the battery change and recharge frequency can be reduced, and the position detecting apparatus can be used without significant interruption.

BRIEF DESCRIPTION OF THE DRAWINGS

The accompanying drawings are incorporated in and constitute a part of the specification. The drawings, together with the general description given above and the detailed description of the preferred embodiments and methods given below, serve to explain the principles of the invention. In such drawings:

FIGS. 22A, 22B, and 22C are diagrams of waveforms of signals to which reference will be made in explaining operations of the position pointing device according to the eighth embodiment of the present invention;

DETAILED DESCRIPTION OF THE PREFERRED EMBODIMENT(S) AND PREFERRED METHOD(S)

Figure 1:
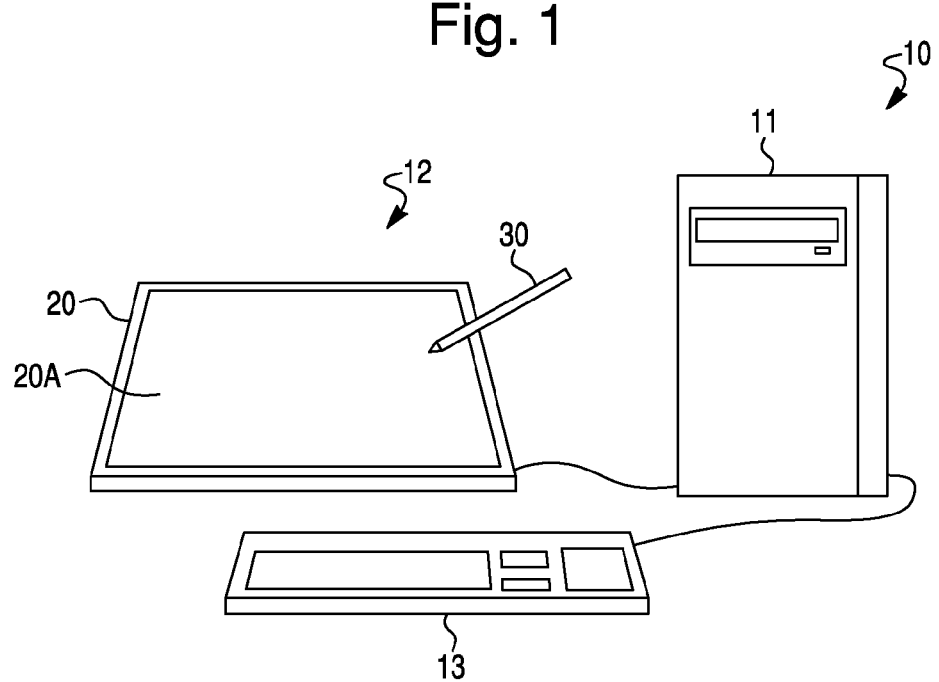
FIG. 1 is a simplified diagram of a system of a first embodiment of the invention.

Reference will now be made to the presently preferred embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification, and appropriate equivalents.

[First Embodiment]

FIG. 1 shows an overview of a computer system 10 of a first embodiment of the invention.

Figure 6A:
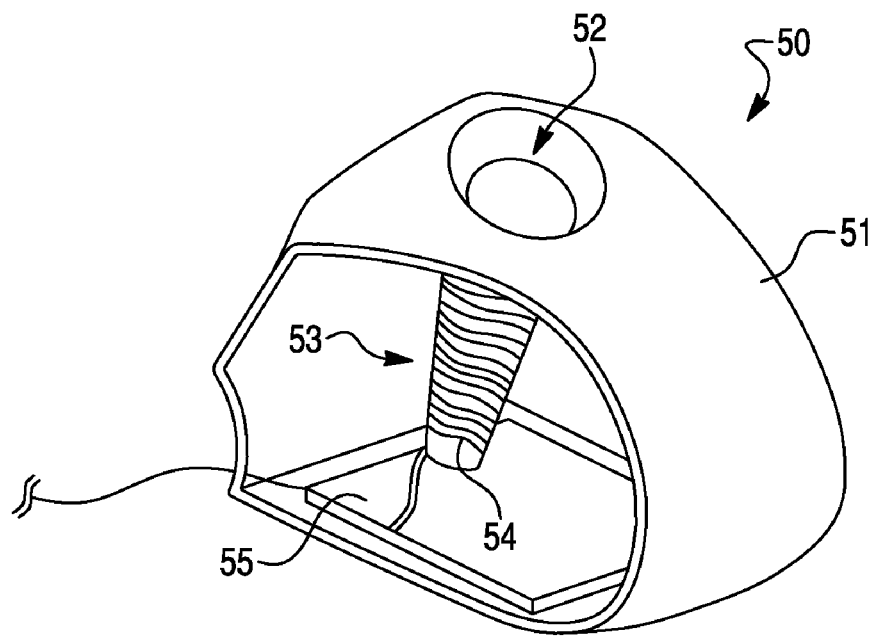
FIG. 6A is an oblique, cross-sectional view of a charger.

In computer system 10 shown in FIG. 1, a monitor 12 and a keyboard 13 are connected to a computer main unit 11. An LCD (Liquid Crystal Display) or other display screen is integrated with a tablet 20 into the monitor 12 to perform position input using a position indicator 30, such as a pen. In addition, a charger 50, as best shown in FIG. 6A as a stand or holder, to charge the position indicator 30, described below, is connected to the computer main unit 11.

The tablet 20 (position detector device) functions as part of a position input system through use in conjunction with the position indicator 30, and detects a position indicated by the position indicator 30 on an input area 20A of the screen of the monitor 12, and outputs information, e.g., the position coordinates to the computer main unit 11.

The charger 50 is used to charge the position indicator 30, and is supplied with power by the computer main unit 11.

Figure 2:
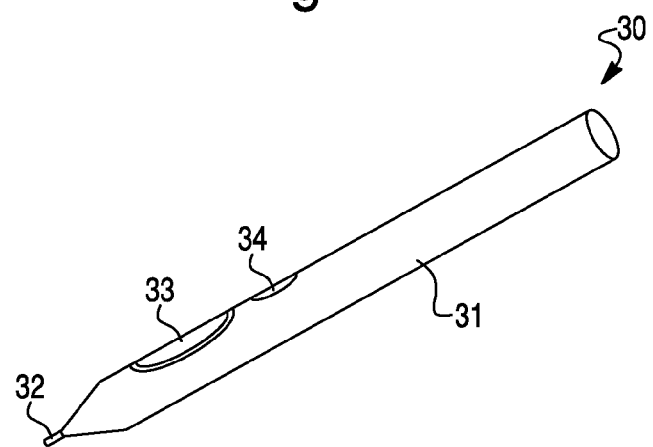
FIG. 2 is an oblique view of a position indicator.

FIG. 2 shows an external view of the position indicator 30. A core 32 protrudes from the tip of a case 31. Two switches 33, 34 are positioned on a side face of the case 31, and an internal circuit 40, as best shown in FIG. 3, to transmit signals to the tablet 20 is housed within the case 31.

Figure 3:
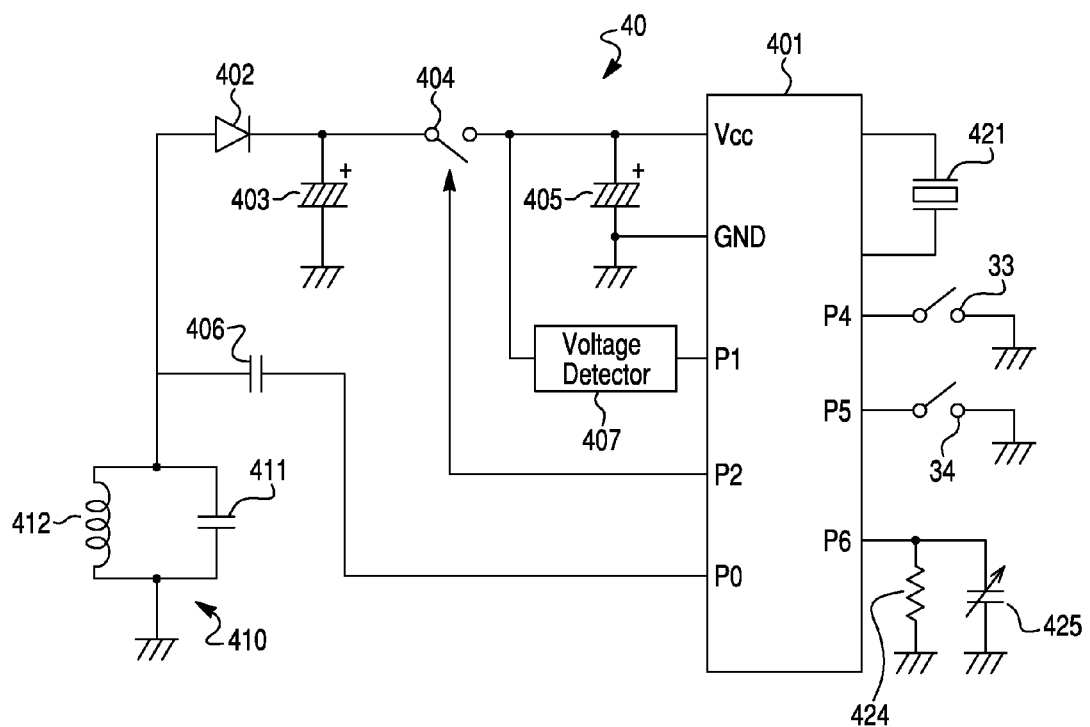
FIG. 3 is an electrical diagram of an internal circuit incorporated in a position indicator.

The switches 33, 34 illustrated in FIG. 2 are represented by the same reference numerals, i.e., 33 and 34, respectively, in the diagram of the internal circuit 40, as illustrated in FIG. 3. The core 32 shown in FIG. 2 is linked to a variable-capacitance capacitor 425 in the internal circuit 40, as best shown in FIG. 3. While the position indicator 30 is used in operations in the display area (input area 20A) of the monitor 12, when pressure is applied to the core 32, the pressure on the core 32 is transmitted to the variable-capacitance capacitor 425, and the capacitance of the variable-capacitance capacitor 425 changes according to the magnitude of the pressure. The switches 33, 34 are operated by the user as desired.

FIG. 3 shows the configuration of the internal circuit 40 of the position indicator 30. The internal circuit 40 comprises a controller (microprocessor) 401, and operates according to a prescribed program. In FIG. 3, an oscillator 421 generates a clock signal to cause operation of the controller 401.

Figure 5:
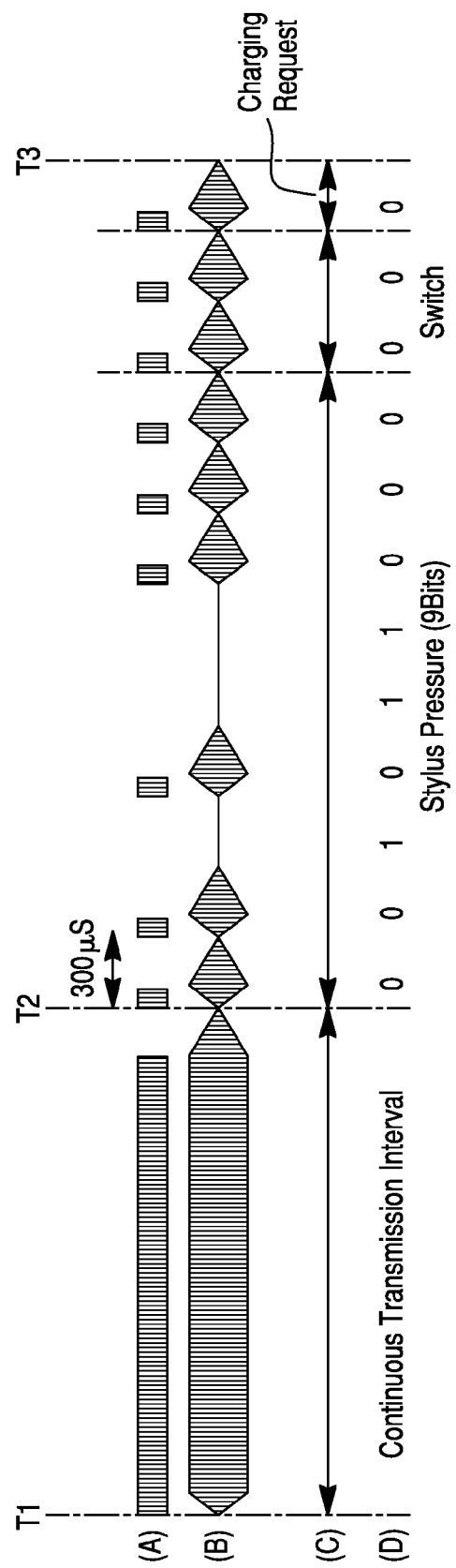
FIG. 5 is a timing chart illustrating transmission operation by a position indicator, in which (A) illustrates the output from terminal P0 of a controller, (B) illustrates the voltage across the terminals of a resonance circuit, (C) shows the operating state, and (D) shows data.

A resonance circuit 410 resonates at a prescribed frequency, and is connected via a capacitor 406 to the terminal P0 of the controller 401. A signal with the same frequency as the resonance frequency of the resonance circuit 410 is output from the terminal P0 of the controller 401 with timing as best shown in FIG. 5, to cause radiation of an AC magnetic field from the resonance circuit 410. An electrical double-layer capacitor 403 supplies power to the controller 401 via a switch 404. A capacitor 405 stabilizes the voltage supplied to the controller 401. An aluminum electrolytic capacitor of a value of, for example, several tens to several hundreds of microfarads is appropriate for capacitor 405.

A voltage detector 407 detects whether the voltage across the capacitor 405 is equal to or greater than a prescribed value, which in this embodiment is 1.8 V, although other values may be used. If the voltage is 1.8 V or higher, a high level voltage (e.g., a voltage substantially equal to the voltage across the capacitor 405) is output. If the voltage is less than 1.8 V, a low level voltage (e.g., 0 V) is output. The switch 404 is switched to the "on" state or the "off" state by a control signal output from terminal P2 of the controller 401. As with an ordinary capacitor, the voltage held by the electrical double-layer capacitor 403 declines with discharge. In order to hold constant the level of the AC magnetic field transmitted from the resonance circuit 410, the level of the signal output from terminal P0 of the controller 401 is held constant, and, to this end, the power supply voltage of the controller 401, that is, the voltage across the capacitor 405, is held constant. To achieve this, in the present embodiment, a power supply assistance unit, described below, is used.

The controller 401 repeats the operation to transmit signals from terminal P0 with the timing shown in FIG. 5. By detecting the presence or absence of signals from terminal P1 periodically during this interval, the voltage across the capacitor 405 is evaluated to determine whether it is at 1.8 V or higher. When the voltage is less than 1.8 V, the controller 401 outputs a control signal from terminal P2, and turns switch 404 on for a prescribed time (for example, approximately 1 µs to approximately 80 µs). If a voltage higher than 1.8 V is held by the electrical double-layer capacitor 403, then a portion of the charge held by the electrical double-layer capacitor 403 moves via the switch 404 to the capacitor 405, and so the voltage of the capacitor 405 rises to 1.8 V or higher. By thus periodically monitoring the terminal P1, the of the capacitor 405 remains substantially in the vicinity of 1.8 V. As the voltage on the electrical double-layer capacitor 403 approaches 1.8 V, the above-described operation causes the extent of the increase in the voltage of the capacitor 405 to become smaller, and the switch 404 is turned on more frequently. When this turning-on occurs at a frequency equal to or greater than a fixed value (for example, once every two times monitored), the controller 401 adjusts the time over which the switch 404 is turned on to be somewhat longer.

According to the above-described operation, the power supply voltage of the controller 401 in this embodiment is always held at a fixed value, so that the strength of signals transmitted from the resonance circuit 410 can be held constant. Further, unnecessary increases in the power supply voltage of the controller 401 are avoided, so there is the further advantage that current consumption is reduced.

A determination that the voltage on the electrical double-layer capacitor 403 has fallen close to 1.8 V may be drawn if the time which the switch 404 is turned on is set to a long value (for example, 80 µs), and the frequency with which the switch 404 is turned on reaches or exceeds a constant value (for example once every two times monitored). Under these circumstances, the controller 401 transmits information (a charging request) indicating that the power supply voltage of the position indicator 30 has fallen, as indicated by the operation of FIG. 5.

When a charging request indicating that the power supply voltage has fallen is transmitted from the position indicator 30, notification is provided to the user by an operation described below. Upon receiving the notification, the user knows to mount the position indicator 30 in the charger 50.

Figure 6B:
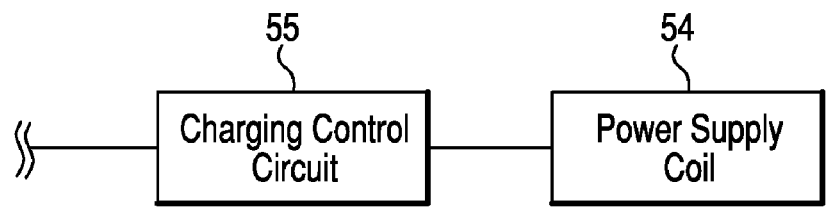
FIG. 6B is a functional block diagram for the charger.

FIG. 6A shows an oblique, cut-away view of the configuration of the charger 50 connected to the computer main unit 11. FIG. 6B is a functional block diagram for operation of the charger 50. An insertion opening 52 provides access to an area into which the position indicator 30 is inserted. A support portion 53 supports the position indicator 30. A power supply coil 54 is wound about the support portion 53. The power supply coil 54 is connected to a charging control circuit 55, and the charging control circuit 55 is connected to the computer main unit 11. The charging control circuit 55 generates an AC voltage at the same frequency as the resonance frequency of the resonance circuit 410 by means of power supplied by the computer main unit 11, and applies the AC voltage to the power supply coil 54. In this manner, an AC magnetic field is generated in the hollow portion of the support portion 53.

When the position indicator 30 is inserted into the insertion opening 52 of charger 50, an induced voltage occurs in the resonance circuit 410 of the position indicator 30. This induced voltage is rectified by a diode 402, as best shown in FIG. 3, causing the electrical double-layer capacitor 403 to be charged.

The position indicator 30 and the charger 50 which operate as explained above contain the following circuits and units: a charging circuit formed by the resonance circuit 410 and the diode 402; an information transmission unit formed by the resonance circuit 410, controller 401 and capacitor 406; a voltage detection unit formed by the voltage detector 407 and controller 401; a power supply assistance unit formed by the capacitor 405, switch 404, voltage detector 407 and controller 401; an AC magnetic field generation unit formed by the power supply coil 54 and charging control circuit 55; and a power transmission unit formed by the resonance circuit 410.

In this embodiment, a power supply assistance unit is provided such that operation is always normal when the voltage across the electrical double-layer capacitor 403 is equal to or greater than the operating voltage (here 1.8 V) of the controller 401. By providing a configuration which causes the voltage across the electrical double-layer capacitor 403 to be increased, a constant voltage can be supplied to the controller 401 even when voltage across the electrical double-layer capacitor 403 falls below the operating voltage of the controller 401.

Figure 4:
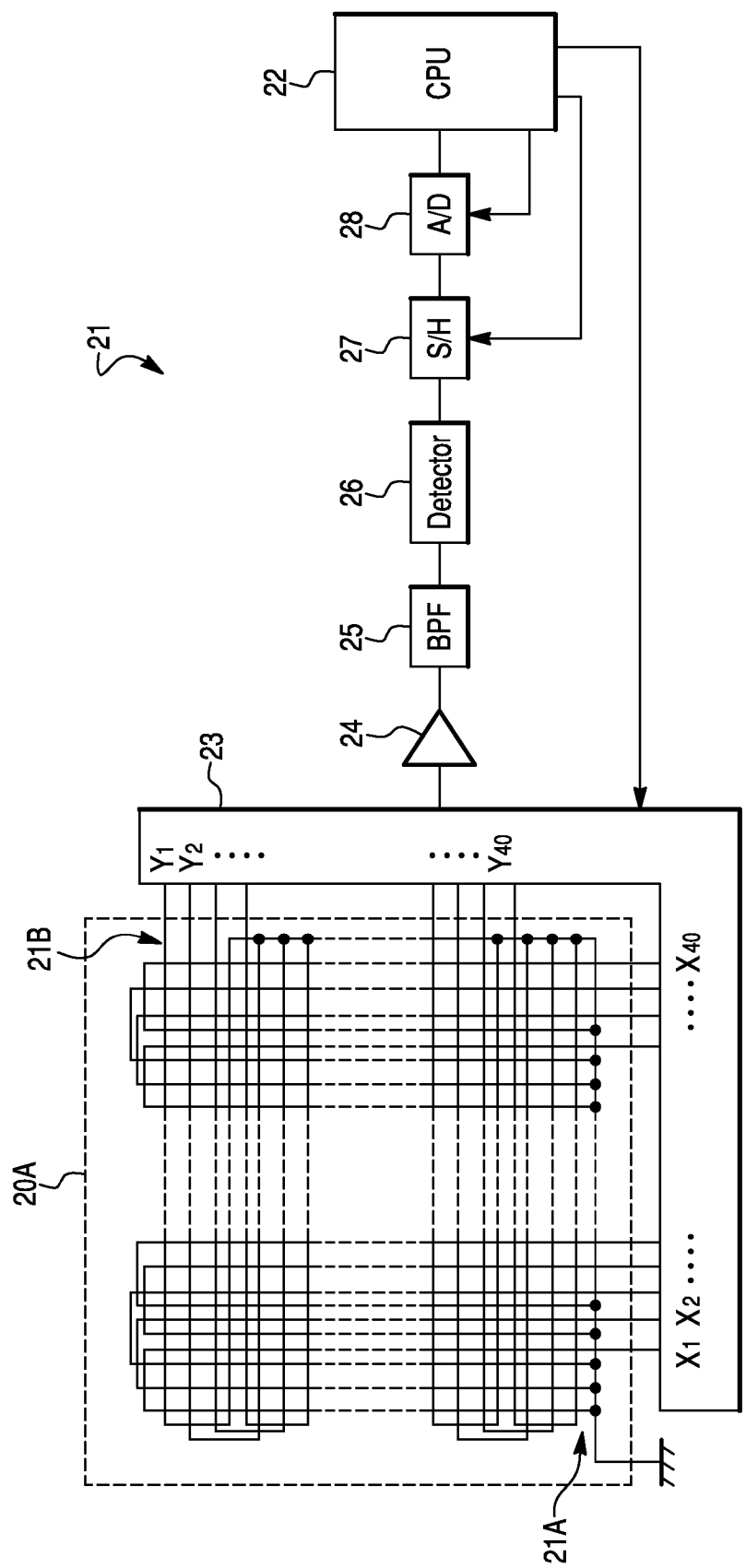
FIG. 4 is an electrical diagram of an internal circuit incorporated in a tablet.

FIG. 4 shows the internal configuration (tablet circuit 21) of the tablet 20. The tablet circuit 21 is a circuit which receives signals transmitted from the internal circuit 40 (FIG. 3) of the position indicator 30, and detects the position indicated by the position indicator 30. The tablet circuit 21 includes a CPU (Central Processing Unit) 22 which exercises control over each of the components illustrated in FIG. 4.

As best shown in FIG. 4, 21A and 21B are loop coil groups, and are embedded in the input area 20A (FIG. 1) of the tablet 20. In the input area 20A, a virtual X-Y orthogonal coordinate system is set. The loop coil group 21A comprises a plurality of loop coils arranged in the X direction, and the loop coil group 21B comprises a plurality of loop coils arranged in the Y direction. Each of the loop coils comprised by the loop coil groups 21A and 21B is connected to a selection circuit 23. The selection circuit 23 selects one loop coil from among the loop coils of the loop coil groups 21A and 21B, according to control of the CPU 22. An amplifier 24 amplifies the signals received by the loop coils selected by the selection circuit 23. A BPF (Band Pass Filter) 25 passes the component of the signal amplified by the amplifier 24 in a specific frequency band. The signal component passed by the BPF 25 is converted into a voltage by a detector circuit 26, and is input to a sample/hold circuit (S/H) 27. The voltage held by the sample/hold circuit 27 is output to an AD conversion circuit (A/D) 28, and the CPU 22 reads the value output from the AD conversion circuit 28, and stores the value as the level of the signal read from the position indicator 30.

FIG. 5 is a timing chart showing transmission operations by the position indicator 30 to transmit signals to the tablet 20. In the figure, (A) illustrates output signals at terminal P0 of the controller 401, (B) illustrates signals of the resonance circuit 410, (C) indicates the state of operation in the controller 401, and (D) shows the contents of response data. The transmission operation shown in FIG. 5 broadly comprises a continuous transmission interval (times T1 to T2), and a data response interval (T2 to T3).

In the continuous transmission interval from times T1 to T2, a signal is output intermittently for a prescribed time (for example 2 ms) or longer from terminal P0 of the controller 401. This prescribed time is set to be sufficiently longer than the transmission time per bit of the data response interval. Employing this continuous transmission operation, an AC magnetic field is radiated intermittently from the resonance circuit 410 during the prescribed time. When the prescribed time elapses, the controller 401 halts output of the signal from terminal P0. After waiting for a time, for example about 200 μs, until the resonance circuit signal has attenuated and has substantially vanished, the controller 401 shifts into the operation of the data response interval (T2 to T3). In the data response interval, 300 μs are allocated to one bit; here, 12 bits of data are transmitted. When the response data is "0", a signal is output for 100 μs from terminal P0, and output is halted for the remaining 200 μs. When the response data is "1", output from terminal P0 is halted for 300 μs. The 12 bits of data comprise nine bits of a stylus pressure value, obtained when the controller 401 detects the discharge time upon discharge through the resistance 424 of the variable-capacitance capacitor 425, as best shown in FIG. 3, the capacitance of which changes according to pressure applied to the core 32; two bits of switch information, resulting from detection of the operation states of the switches 33 and 34; and the above-described one bit of charging request information.

Operation of the tablet circuit 21 when the position indicator 30, operating in this manner, is placed on the input area 20A of the tablet, is described below.

First, the CPU 22 detects the received signal level while switching in order among single loop coils in the loop coil group 21B (indicator detection step). Here, if the position indicator 30 is placed at a position which is closest to, for example, loop coil Y7 among the loop coil group 21B, then the CPU 22 detects the strongest signal level when loop coil Y7 is selected. Next, the Y7 loop coil for which the strongest signal level was detected is selected, and the CPU 22 detects the signal level over a period which is short compared with the data response period (300 μs) of the position indicator (continuous transmission detection step). Here, when a signal at or above a prescribed level is detected continuously over a longer interval than the data response period (300 μs), operation proceeds to the coordinate detection step described below.

When a signal is detected at or above a prescribed level, continuously over an interval longer than the data response period (300 μs), the position indicator 30 has entered into the continuous transmission interval. A stabilized signal is radiated from the position indicator 30 for a period of time.

The CPU 22 detects the approximate X-axis position in the input area 20A. The CPU 22 detects the received signal level while switching and selecting in order one loop coil from among the loop coil group 21A (X-axis position detection step). Here, if the position indicator 30 is placed in a position which is closest to the loop coil X14 of the loop coil group 21A, then the CPU 22 detects the strongest signal level when the loop coil X14 is selected. Next, the CPU 22 detects the signal level while switching in order between a plurality of (for example, five) loop coils centered on X14 and Y7. Here, a strong signal is detected from the loop coils X14 and Y7 which are closest to the position indicator 30, and the further from these loop coils, the weaker is the signal. The CPU 22 performs interpolation calculations between coils based on the signal level distribution detected for the X axis and Y axis, to accurately calculate the indicated position in the input area 20A (coordinate calculation step). The interpolation calculation is performed in a manner known in the art.

When the coordinate calculation step ends, the CPU then proceeds to a continuous transmission end detection step. The CPU 22 causes the selection circuit 23 to select Y7. In this state, the CPU 22 detects the signal level continuously in periods as short as possible (for example, at 5 μs intervals). When continuous transmission by the position indicator 30 ends, the signal from the resonance circuit 41 is gradually attenuated. The CPU 22 detects the fact that the reception level has fallen to or below a prescribed value, and detects the timing with which continuous transmission ends. When the reception level falls to or below the prescribed value, the CPU 22 saves this time as the continuous transmission end time, and then proceeds to a data reception step.

Based on the continuous transmission end time, the CPU 22 performs signal detection 12 times with the same period as the data response period of the position indicator 30 (300 μs). In this signal detection, the delay time from the continuous transmission end time is adjusted in advance such that detection occurs precisely when the signal generated in the resonance circuit 410 when there is a data "0" response from the position indicator 30 is maximum.

In accordance with the above-described operation, the 12 bits of data transmitted from the position indicator 30 can be accurately detected by the CPU 22 as the presence or absence of a detection signal.

Figure 7:
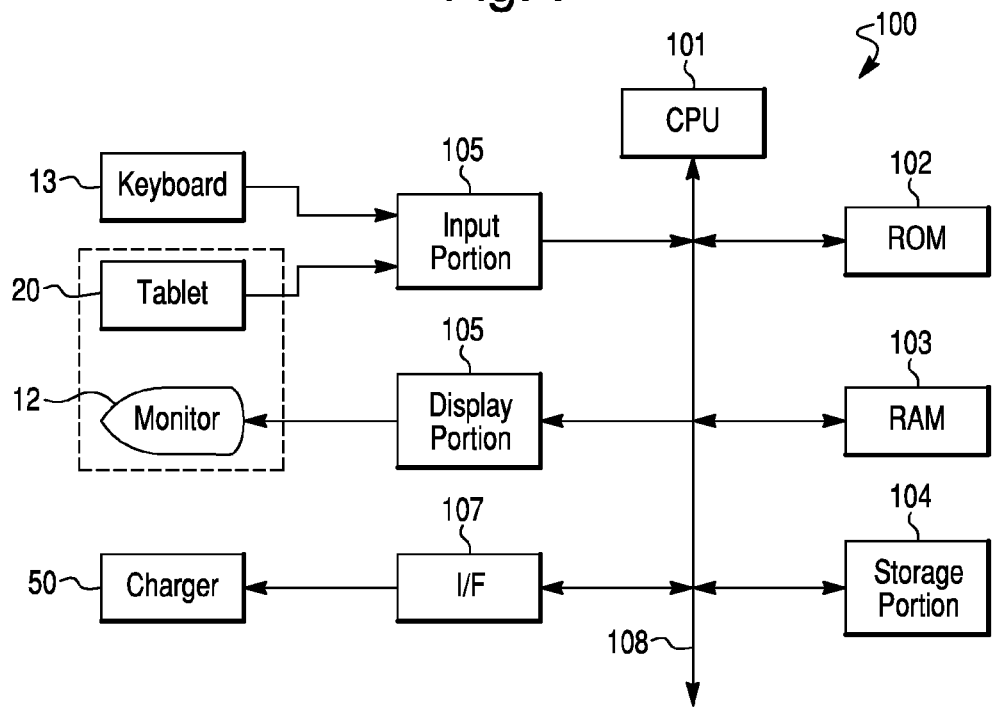
FIG. 7 is a functional block diagram showing the configuration of the control system of a computer main unit.

FIG. 7 is a block diagram showing the functional configuration of the control system 100 of the computer main unit 11.

The control system 100, as best shown in FIG. 7, comprises a CPU 101 which executes a program to perform data computation processing; ROM (Read-Only Memory) 102 which stores programs, data and similar; RAM (Random Access Memory) 103 which temporarily stores programs executed by the CPU 101, data and similar used in computation processing; a storage portion 104 which stores various data; an input portion 105, to which a keyboard 13 and the tablet 20 are connected; a display portion 106 to which is connected the monitor 12; and an interface portion 107. Each of these portions is connected to a bus 108.

In this embodiment, the interface portion 107 is connected to external equipment. In addition to performing functions to send and receive various data to and from the external equipment, the interface portion 107 has a function of supplying power to external equipment. The charger 50 is connected to the interface portion 107, and the interface portion 107 supplies power to the charger 50 under control of the CPU 101.

Figure 8:
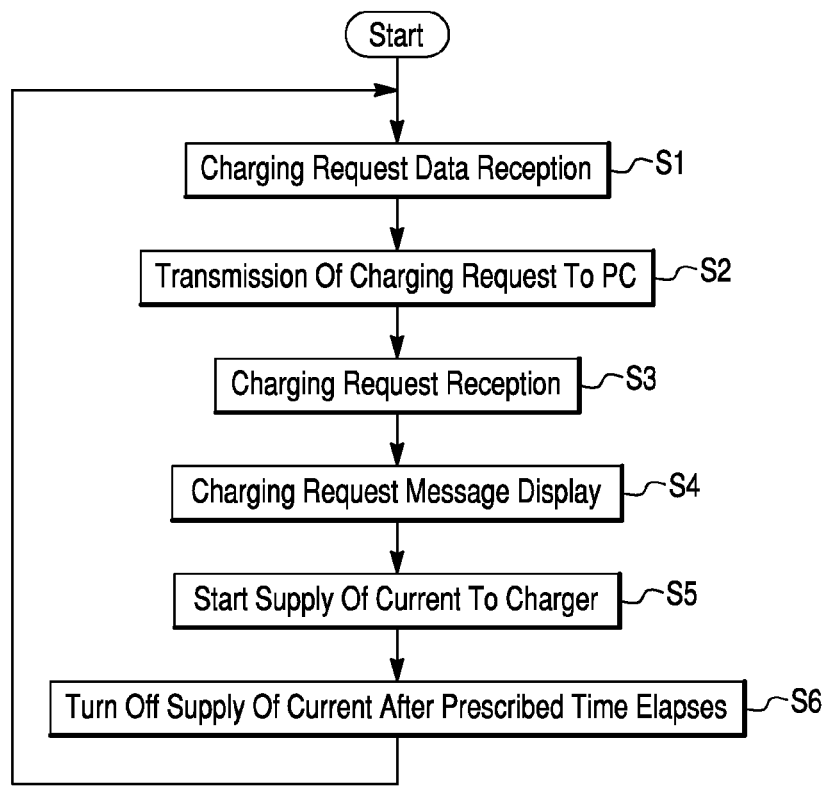
FIG. 8 is a flowchart showing charging control processing executed in the computer main unit.

Further, when a charging request, which requests charging of the position indicator 30, is input from the tablet 20 via the input portion 105, the CPU 101 executes charging control processing, as best shown in FIG. 8, in concert with the tablet 20 and charger 50, to cause charging of the position indicator 30.

FIG. 8 is a flowchart showing charging control processing executed in the system 10.

Charging control processing is started when the tablet 20 receives charging request data "1" transmitted from the position indicator 30 (step S1). As explained above, charging request data "1" is data indicating that the position indicator 30 requests charging of the electrical double-layer capacitor 403. Upon receiving the charging request data "1", the tablet 20 transmits a charging request to the computer main unit 11 (step S2).

Figure 9:
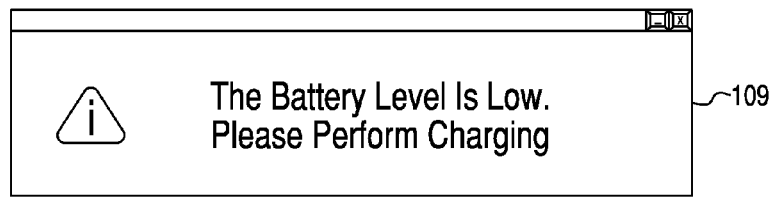
FIG. 9 illustrates an example of a charge request message displayed on a monitor during charging control processing.

The CPU 101, upon receiving the charging request from the tablet 20 (step S3), displays a charging request message on the monitor 12 (step S4). This charging request message is a message requesting that the user operating the position indicator 30 set the position indicator 30 in the charger 50 in order to allow charging to occur. The charging request message may for example be displayed in a charging guidance screen 109 as shown in FIG. 9.

Next, the CPU 101 causes the start of the supply of power to the charger 50 from the interface portion 107 (step S5), and, after a prescribed time has elapsed, causes the supply of power to the charger 50 to be stopped (step S6), and then returns to step S1.

In this way, the charger 50 generates an AC magnetic field in the vicinity of the coil 412 of the internal circuit 40 (FIG. 3), and thus the electrical double-layer capacitor 403 is charged. Compared with a so-called secondary battery (nickel-cadmium battery or similar), charging of the electrical double-layer capacitor 403 is completed in an extremely short amount of time (for example, approximately 10 to 50 seconds). Hence, the time required for supplying power to the charger 50 from the interface portion 107, including the time required for the user to set the position indicator 30 in the charger 50, is about two to about three minutes or so.

In charging control processing, when the voltage across the electrical double-layer capacitor 403 falls during use of the position indicator 30 by the user, a display on the monitor 12 provides guidance to charge the position indicator 30, so that the user can charge the position indicator 30 according to this guidance. Charging of the position indicator 30 is performed in a very short time simply by inserting the position indicator 30 into the insertion opening of the charger 50, so that the user performs only an extremely simple operation, without diminution of operability.

In the position input system of this embodiment, signals are transmitted by power accumulated in the electrical double-layer capacitor 403. Compared with known devices in which signals are transmitted from the tablet, in the present embodiment strong signals can be received by the tablet 20 from the position indicator even under extremely low power consumption. Consequently, strong signals can be initiated by and received from the position indicator 30 even in the presence of noise from external sources, and in particular noise from an integrated LCD, so advantageously coordinate position and data can be detected with stability.

Further, the electrical double-layer capacitor 403 does not require battery replacement as in the case of known devices which incorporate primary batteries. Moreover, charging can be performed in an extremely short time compared with other secondary batteries having comparable capacities, so that the user is not inconvenienced for a prolonged period while the position indicator recharges.

When charging the electrical double-layer capacitor 403 of the position indicator 30, charging can be performed extremely easily, merely by setting the position indicator 30 in the charger 50. This charging is performed by causing the power supply coil 54 of the charger 50 to generate an AC magnetic field in the vicinity of the coil 402. The power supply coils 54 and 412 do not make contact. As a result of this contact-free configuration, there is greater freedom of design of the charger 50 and position indicator 30, and durability can be further enhanced.

In the above first embodiment, an example was explained in which, by displaying a charging guidance screen 109 or similar notification on the monitor 12 the user is prompted to perform charging. However, the invention is not limited to such a configuration. For example, the need for charging can be reported through the position indicator 30, tablet 20, or charger 50. This reporting by the position indicator 30, tablet 20 and charger 50 may be performed independently, or may be performed in combination with one another and optionally simultaneously, or may be performed in place of a charging request message displayed on the monitor 12 in the above-described charging control processing, or may be performed in conjunction with display of the charging request message.

Figure 10A:
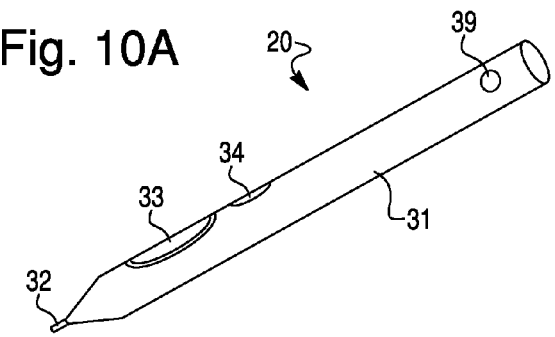
FIG. 10A shows an example of a light-emitting portion on a position indicator.

For example, as best shown in FIG. 10A, a light-emitting portion 39 is provided in the case 31 of the position indicator 30. When the controller 401 determines that charging of the electrical double-layer capacitor 403 is necessary, the light-emitting portion 39 is caused to light or to flash under control of the controller 401. The light-emitting portion 39, for example, may be an LED (light-emitting diode).

Figure 10B:
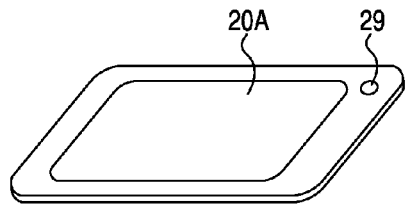
FIG. 10B shows an example of a light-emitting portion on a tablet.

As another example, as shown in FIG. 10B, a light-emitting portion 29 configured as an LED similarly to the light-emitting portion 39 may be provided in the housing of the tablet 20. In this example, when the tablet receives a charging request data "1" transmitted from the position indicator 30, the light-emitting portion 29 is caused to light under control of the CPU 22.

Figure 10C:
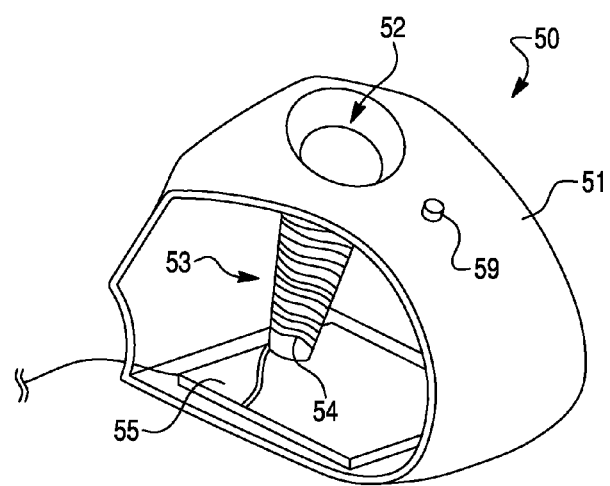
FIG. 10C is a cross-sectional view of a light-emitting portion on a charger.

As a further example, as shown in FIG. 10C, a light-emitting portion 59 configured as an LED similarly to the light-emitting portions 29 and 39 may be provided in the housing 51 of the charger 50. The light-emitting portion 59 may be caused to light or to flash while power is being supplied from the interface portion 107 of the computer main unit 11 to the charger 50. In this case, in step S5 of the charging control processing (FIG. 8), the light-emitting portion 59 is caused to light or to flash when power supply to the charger 50 is started, and the light-emitting portion 59 is extinguished when power supply to the charger 50 is stopped in step S6.

Alternatively, the light-emitting portion 59 may be caused to light or to flash when power is received from the interface portion 107 of the computer main unit 11, separately from the charging control circuit 55 of the charger 50. In this case, when in step S3 of the charging control processing, the CPU 101 receives a charging request from the tablet 20, and power is supplied from the interface portion 107 to the light-emitting portion 59.

In all of the above examples, the user is notified of the need to charge the position indicator 30 through the lighting or flashing of the light-emitting portion 59, permitting the user to promptly charge the position indicator 30.

In the above first embodiment, an example was explained in which the computer main unit 11 supplies power to the charger 50 when the charging request data transmitted from the position indicator 30 is "1"; but the invention is not limited to such a configuration. For example, control may be executed in which power is supplied to the charger based on the time elapsed since the previous charging. Below, such cases are explained as modified examples 1 and 2 of this embodiment.

MODIFIED EXAMPLE 1

Figure 11:
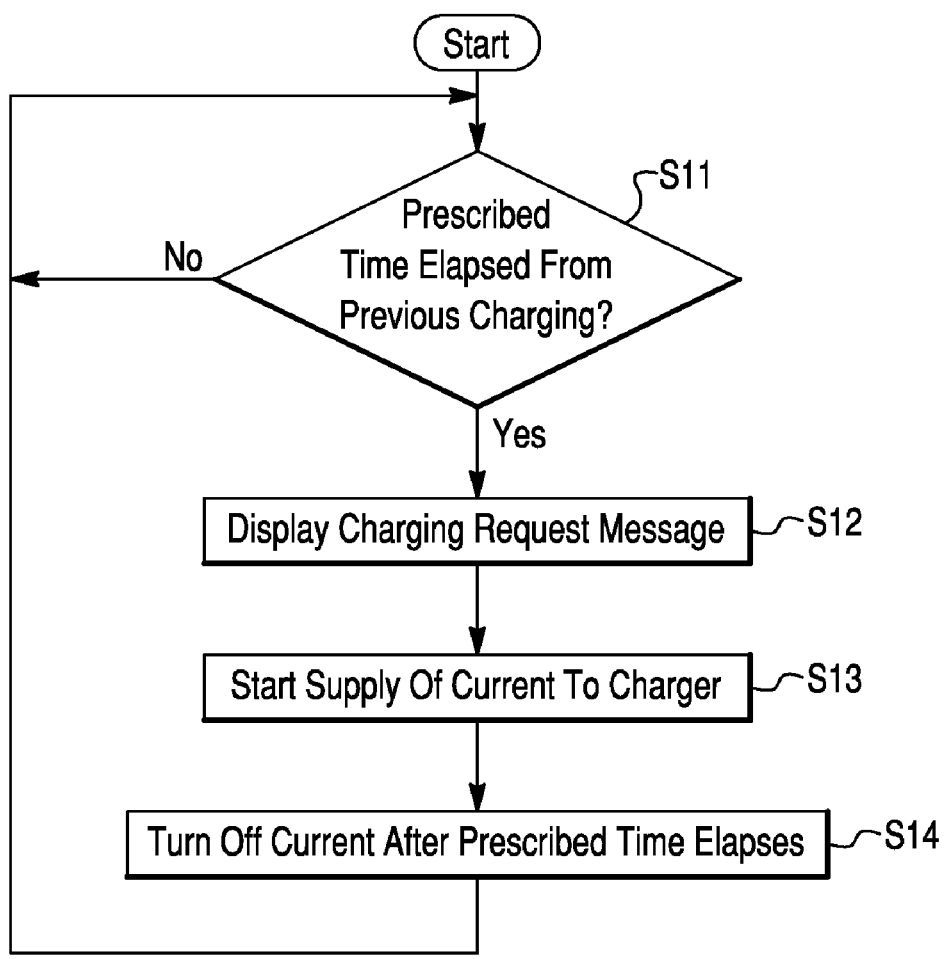
FIG. 11 is a flowchart illustrating charging control processing in a modified example of the first embodiment.

FIG. 11 is a flowchart showing charging control processing in a modified example of the above first embodiment. The configuration of this modified example is similar to that of the computer system 10 of the above first embodiment, except for the operation of charging control processing.

In the charging control processing shown in FIG. 11, the CPU 101 of the computer main unit 11 counts the time elapsed from the previous charging of the position indicator 30 (step S11), and when this elapsed time has reached a prescribed time (step S11: Yes), a charging request message is displayed on the monitor 12 (step S12), and causes the supply of power from the interface portion 107 to the charger 50 to be started (step S13). Then, after a prescribed time has elapsed, the CPU 101 stops the supply of power to the charger 50 (step S14), returns to step S11, and counts the elapsed time.

In this case, even when the tablet 20 has not received charging request data from the position indicator 30, the user is prompted to charge the position indicator 30. Hence when charging request data is not received from the position indicator 30, the user can still be informed of the need to charge the position indicator 30. Situations in which the charging request data cannot be received may include, for example, when the voltages on the electrical double-layer capacitor 403 and capacitor 405 have fallen to extremely low levels and the controller 401 cannot operate at all, or when some obstacle exists or the distance between the position indicator 30 and tablet 20 is too great, so that data cannot be transmitted from the position indicator 30 to the tablet 20.

MODIFIED EXAMPLE 2

Figure 12:
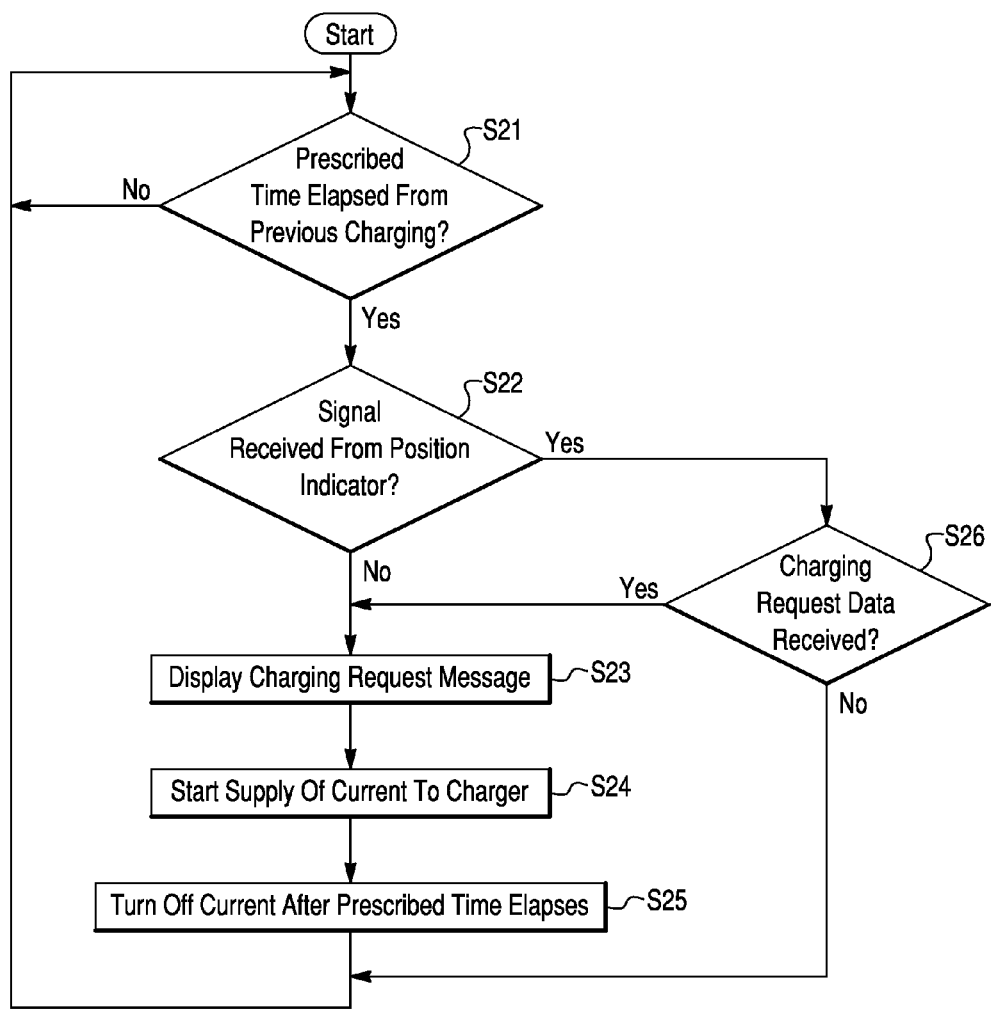
FIG. 12 is a flowchart illustrating charging control processing in another modified example of the first embodiment.

FIG. 12 is a flowchart showing charging control processing in another modified example of the above first embodiment. The configuration of this modified example is similar to that of the system 10 of the above-described first embodiment, except for the operation of charging control processing.

In the charging control processing shown in FIG. 12, the CPU 101 of the computer main unit 11 counts the time elapsed from the previous charging of the position indicator 30 (step S21). When this elapsed time has reached a prescribed time (step S21: Yes), the CPU 101 determines whether the tablet 20 is able to receive signals transmitted from the position indicator 30 (step S22).

When no signals transmitted from the position indicator 30 are being received by the tablet 20 (step S22: No), the controller 401 displays a charging request message on the monitor 12 (step S23) and starts the supply of power from the interface portion 107 to the charger 50 (step S24). After a prescribed time has elapsed, the controller 401 stops the supply of power to the charger 50 (step S25), and returns to step S21 to begin counting elapsed time.

On the other hand, when after the prescribed time has elapsed from the previous charging, signals from the position indicator 30 are received by the tablet 20 (step S22: Yes), the controller 401 determines whether signals received by the tablet 20 comprise the charging request data "1" (step S26). When the charging request data "1" is present (step S26: Yes), the controller 401 proceeds to step S23 and causes charging to be performed. On the other hand, when the charging request data "1" is not present (step S26: No), the controller 401 returns to step S21.

In the example shown in FIG. 12, even when charging request data is not received by the tablet 20 from the position indicator 30, the user can be prompted to charge the position indicator 30. For example, even when charging request data cannot be received from the position indicator 30, the user can be made to charge the position indicator 30 to return to a state in which use is possible. Further, when signals are transmitted from the position indicator 30 to the tablet 20 and moreover there is no charging request data "1" from the position indicator 30 even after the prescribed time has elapsed from the previous charging, that is, when adequate charge remains on the electrical double-layer capacitor 403 in the position indicator 30, no charging is performed, and so unnecessary charging can be avoided.

In the above first embodiment and modified examples, configurations were explained in which the supply of power to the charger 50 is started and stopped under control of the CPU 101. However, the invention is not limited to such a configuration, and for example a switch may be provided on the charger 50. Such a case is explained as a second embodiment.

[Second Embodiment]

Figure 13A:
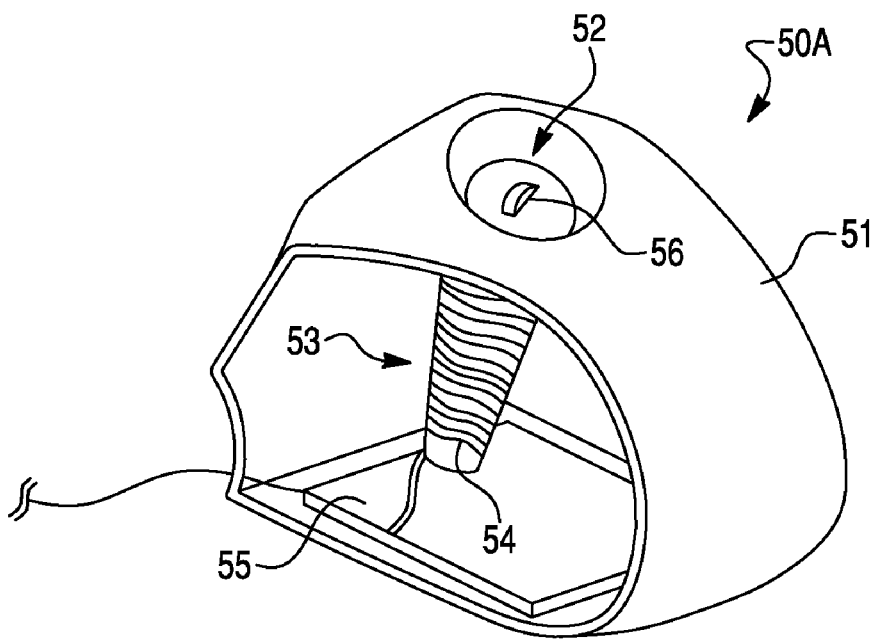
FIG. 13A is an oblique, cross-sectional view of a charger of a second embodiment of the invention.
Figure 13B:
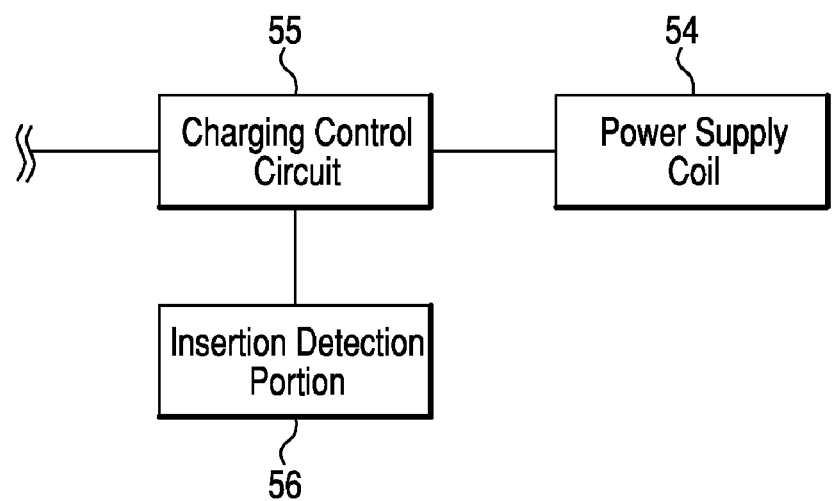
FIG. 13B is a functional block diagram for the charger.

FIG. 13A shows an oblique, cross-sectional view of a charger 50A (stand) of a second embodiment of the invention, and FIG. 13B is a functional block diagram for operation of the charger 50A.

The computer system 10 of this second embodiment has a configuration common with that of the above first embodiment except for the charger 50A shown in FIG. 13A, and so common portions are omitted from the drawings and the detailed description hereinbelow.

As best shown in FIG. 13A, the charger 50A of this second embodiment is provided with a detection switch 56 in the portion between the inner side of the insertion opening 52 and the inside of the support portion 53. The detection switch 56 is configured so as to move when pressure is applied, and an internal electrical contact is closed upon movement of switch 52 to a closed position.

As shown in FIG. 13B, the detection switch 56 is connected to the charging control circuit 55. The charging control circuit 55 passes a current to the power supply coil 54 only in the state in which the detection switch 56 is closed.

In this configuration, when the position indicator 30 (FIG. 2) is inserted into the insertion opening 52 of the charger 50A, the detection switch 56 is pressed by the case 31, and current begins to be supplied to the power supply coil 54. In this state, an AC magnetic field is generated by the power supply coil 54 in the vicinity of the position indicator 30, and an induced voltage appears in the coil 412 (FIG. 3), so that the electrical double-layer capacitor (FIG. 3) is charged. When the position indicator 30 is removed from the insertion opening 52, current to the power supply coil 54 is stopped. Hence, when charging the position indicator 30, it is sufficient to insert the position indicator 30 into the insertion opening 52, wait for a prescribed length of time (for example, approximately 10 to 50 seconds), and then remove the position indicator 30.

In this case, even when power is constantly supplied to the charger 50A from the computer main unit 11, current is passed to the power supply coil 54 only when the position indicator 30 is actually set in the charger 50A and the position indicator 30 is being charged, so that unnecessary power consumption can be avoided. Further, there is no longer a need for the computer main unit 11 to control current flow to the charger 50A, so that more efficient control is possible.

In the above first and second embodiments and in the modified examples, configurations were described in which the position indicator 30 was charged by chargers 50, 50A; but a tablet which integrates the functions of these chargers 50, 50A can be used as explained below with regard to third and fourth embodiments of the invention.

[Third Embodiment]

Figure 14:
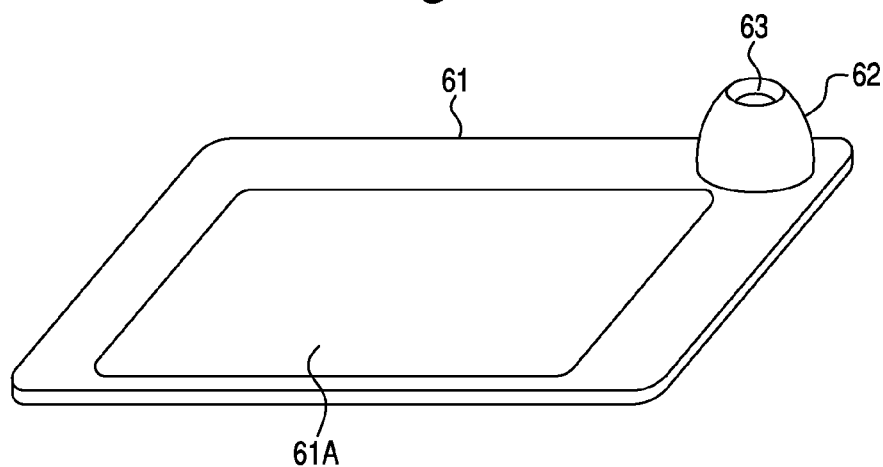
FIG. 14 is an oblique view illustrating the tablet of a third embodiment of the invention.

FIG. 14 is an oblique view showing the tablet 61 of a third embodiment of the invention.

The computer system 10 of this third embodiment comprises the tablet 61 shown in FIG. 14 in place of the tablet 20 and charger 50 shown in FIG. 1. Except for this tablet 61, the configuration of the computer system 10 is common to that of the above first embodiment, and so common portions are omitted from the drawings and the detailed description provided hereinbelow.

The tablet 61 shown in FIG. 14 has a configuration in which an input area 61A is provided on the upper face of a substantially planar housing. The tablet 61 incorporates an internal circuit 21 (FIG. 4) similar to that of the tablet 20, and in the input area 61A are embedded loop coil groups 21A, 21B. On the outside of the input area 61A is positioned a charging portion 62 (stand) on the upper face of the tablet 61. The charging portion 62 has an outer casing which is substantially dome-shaped, and an insertion opening 63 is formed integrally in the upper end of this outer casing. The insertion opening 63 has a diameter enabling insertion of at least the tip portion of the position indicator 30 (FIG. 2), and is connected to a hole extending to the interior of the charging portion 62.

The charging portion 62 incorporates a power supply coil 54 (FIG. 6) and charging control circuit 55 (FIG. 6) similar to the charger 50. The power supply coil 54 is wound around the outside of the hole connected to the charging portion 62.

When current is supplied to the power supply coil 54 incorporated into the charging portion 62, by inserting the position indicator 30 into the insertion opening 63, an AC magnetic field is generated in the vicinity of the coil 412 (FIG. 3) of the position indicator 30. The electrical double-layer capacitor 403 (FIG. 4) is charged by the current flowing in this coil 412 which is induced by the AC magnetic field.

That is, the tablet 61 combines the functions of the tablet 20 for performing position input operations using the position indicator 30 and the functions of the charger 50 to perform charging of the position indicator 30. Hence, according to this third embodiment, advantageously the computer system 10 can be installed in a smaller space. Further, the computer main unit 11 and tablet 61 can be connected by what appears to be a single cable, so that cable layout is simplified, thereby easing installation.

[Fourth Embodiment]

Figure 15:
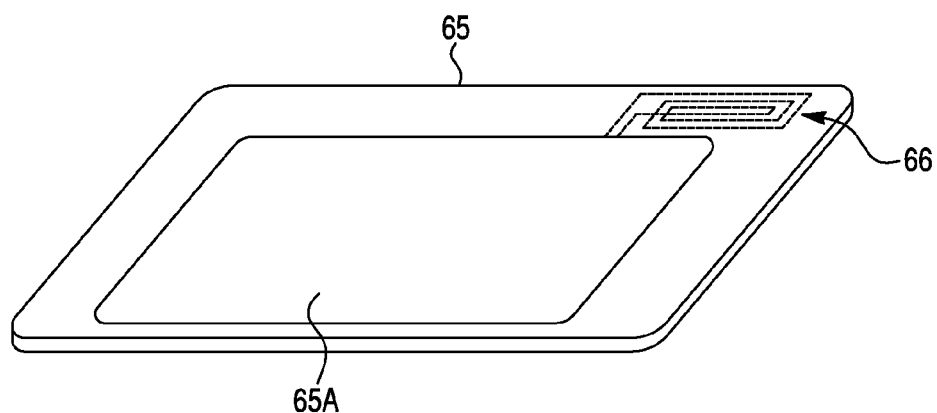
FIG. 15 is an oblique view of a tablet of a fourth embodiment of the invention.

FIG. 15 is an oblique view showing the configuration of the tablet 65 of a fourth embodiment of the invention.

The computer system 10 of this fourth embodiment comprises the tablet 65 shown in FIG. 15 in place of the tablet 20 and charger 50 shown in FIG. 1. Except for this tablet 65, the configuration of the computer system 10 is common to that of the above first embodiment, and so common portions are omitted from the drawings and detailed description provided hereinbelow.

The tablet 65 shown in FIG. 15 has a configuration in which an input area 65A is provided on the upper face of a substantially planar housing. The tablet 65 incorporates an internal circuit 21 (FIG. 4) similar to that of the tablet 20, and in the input area 65A are embedded loop coil groups 21A, 21B. On the outside of the input area 65A is embedded a power supply coil 66 (AC magnetic field generation unit) for the tablet 65. The power supply coil 66 is, for example, a loop coil positioned in a plane parallel to the upper face of the tablet 65, and more specifically, is mounted by means of a printed board or similar structure having a plurality of layers.

The tablet 65 incorporates a charging control circuit 55 (FIG. 6) similar to that of the charger 50. The charging control circuit 55 is connected to the power supply coil 66. Hence an AC voltage is applied to the power supply coil 66 under control of the charging control circuit 55, and an AC magnetic field appears in the direction perpendicular to the plane of the power supply coil 66.

According to this configuration, by incorporating the charging control circuit 55 in the tablet 65, when the tip of the position indicator 30, that is, the coil 412 (FIG. 4), is brought close to the power supply coil 66 when current is being supplied to the power supply coil 66, an AC magnetic field is generated in the vicinity of the coil 412. The electrical double-layer capacitor 403 (FIG. 4) is charged by the current flowing in the coil 412 induced by this AC magnetic field. Hence merely by performing the simple operation of, for example, standing or otherwise positioning the position indicator 30 above the power supply coil 66, the position indicator 30 can be charged.

Further, the tablet 65 combines the functions of the tablet 20 to perform position input operations using the position indicator 30 and the functions of the charger 50 to charge the position indicator 30. Consequently, the system 10 advantageously can be installed in a smaller space. Further, the computer main unit 11 and tablet 65 can be connected by what appears to be a single cable, so that cable layout is simplified, and installation is made easier.

It is of course possible to provide, by printing or other means, a display on the upper face of the tablet 65 indicating the location in which the power supply coil 66 is embedded, and to provide guidance, in a charging request message displayed on the monitor 12, for charging the position indicator 30 using this printed display as a guide.

[Fifth Embodiment]

Figure 16:
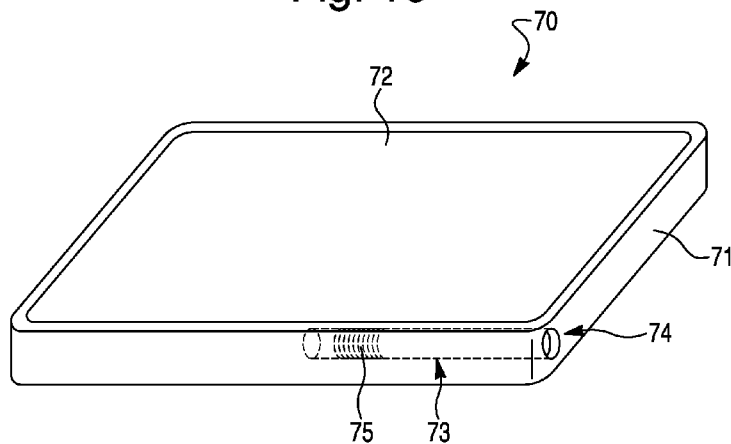
FIG. 16 illustrates a tablet-type computer of a fifth embodiment of the invention.

FIG. 16 is an oblique view showing the configuration of the tablet-type computer 70 of a fifth embodiment of the invention.

The tablet-type computer 70 of this fifth embodiment is a portable-type computer incorporating a battery (not shown) as a power supply, and has functions similar to those of the systems 10 in the above first through fourth embodiments and in the modified examples.

The tablet-type computer 70 incorporates the control system 100 of the computer main unit 11 in a substantially board-shaped case 71. A liquid crystal display panel 72 (display device) is positioned on the surface of the case 71, and below the liquid crystal display panel 72 is housed an internal circuit 21 (FIG. 4) incorporated within the tablet 20, with loop coil groups 21A, 21B embedded. That is, the liquid crystal display panel 72 also functions as an input area, and position input operations using the position indicator 30 can be performed on the liquid crystal display panel 72.

Further, the functional configuration of the tablet-type computer 70 is similar to that of the control system 100 of the computer main unit 11 in FIG. 7, and various basic control programs and application programs are executed based on input operations by the position indicator 30.

An indicator housing portion 73 which houses the position indicator 30 (FIG. 2) is formed in the case 71 of the tablet-type computer 70. The indicator housing portion 73 is a tube-shaped structure, linked to an insertion opening 74 which opens onto a side face of the case 71. The depth and inner diameter of the insert opening 74 are sized to enable housing of the case 31 of the position indicator 30. Hence by inserting the position indicator 30 into the insertion opening 74, the position indicator 30 can be housed within the indicator housing portion 73. Further, a power supply coil 75 (AC magnetic field generation unit) is wound around the outside of the region of the indicator housing portion 73 housing the tip portion of the position indicator 30. An AC voltage is applied to the power supply coil 75 by a charging control circuit, not shown. By use of this AC voltage, an AC magnetic field is generated within the indicator housing portion 73.

In the tablet-type computer 70 configured as described above and illustrated in FIG. 16, when the position indicator 30 is not in use and is housed in the indicator housing portion 73, the position indicator 30 is charged. Hence the position indicator 30 is maintained in a constantly charged state, and there is the advantage that the position indicator 30 can be used simply by removal from the indicator housing portion 73. Further, while there is a limit to the capacity of the battery in the tablet-type computer 70, if, as in the above first embodiment and modified examples, current is supplied to the power supply coil 75 only when the position indicator 30 must be charged, power consumption can be greatly reduced, with no effect on the availability for use of the tablet-type computer 70.

In the tablet-type computer 70, the position indicator 30 and the loop coil groups 21A, 21B are opposed on either side of the liquid crystal display panel 72, and there is the possibility that signals transmitted from the position indicator 30 may be affected by electromagnetic noise. But because, as described above, the position indicator 30 can transmit signals efficiently and at high power, signals from the position indicator 30 can be received satisfactorily by the loop coil groups 21A, 21B. As a result, positions input using the position indicator 30 can be detected precisely and with stability, and satisfactory operability is secured.

In the above first through fifth embodiments and the modified examples, examples were explained in which a method of generating an AC magnetic field in the vicinity of the coil 412 was used as the method of charging the electrical double-layer capacitor 403 incorporated within the position indicator 30. But the invention is not limited to such a method. For example, exposed terminals electrically connected to both ends of the electrical double-layer capacitor 403 may be provided in the case 31, so that by connecting the exposed terminals to a power supply device external to the position indicator 30, the electrical double-layer capacitor 403 can be charged.

Further, in the above first through fifth embodiments and the modified examples, an electrostatic coupling method may be used to detect the position of the position indicator 30 using the tablet 20.

Below, an example of this is explained as a sixth embodiment.

[Sixth Embodiment]

Figure 17:
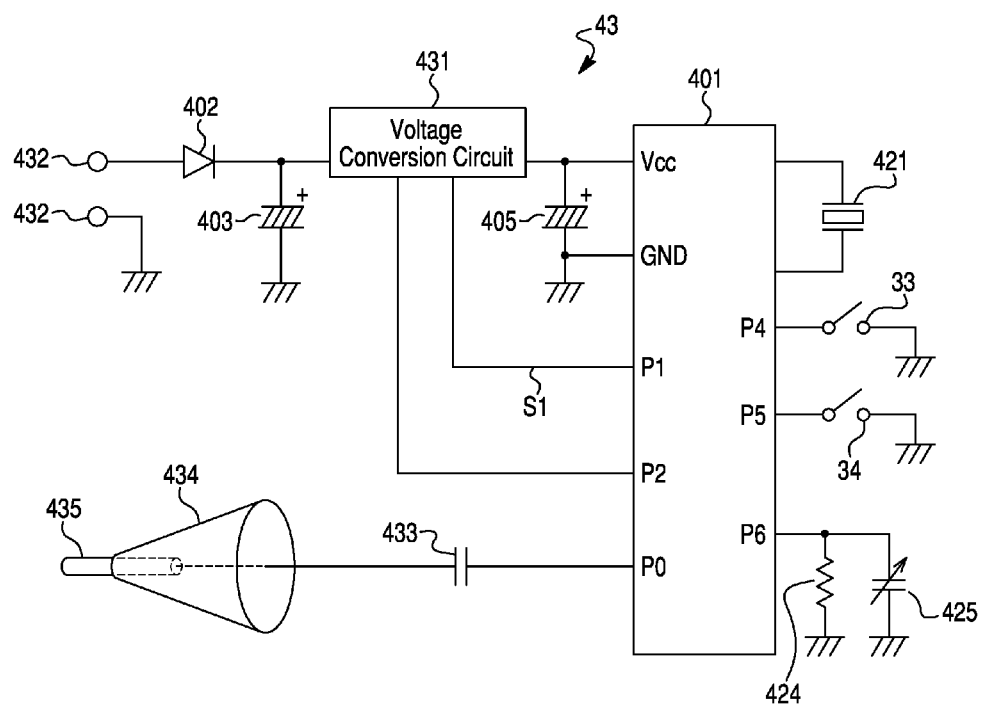
FIG. 17 is a diagram of the internal circuitry of a position indicator of a sixth embodiment of the invention.
Figure 18:
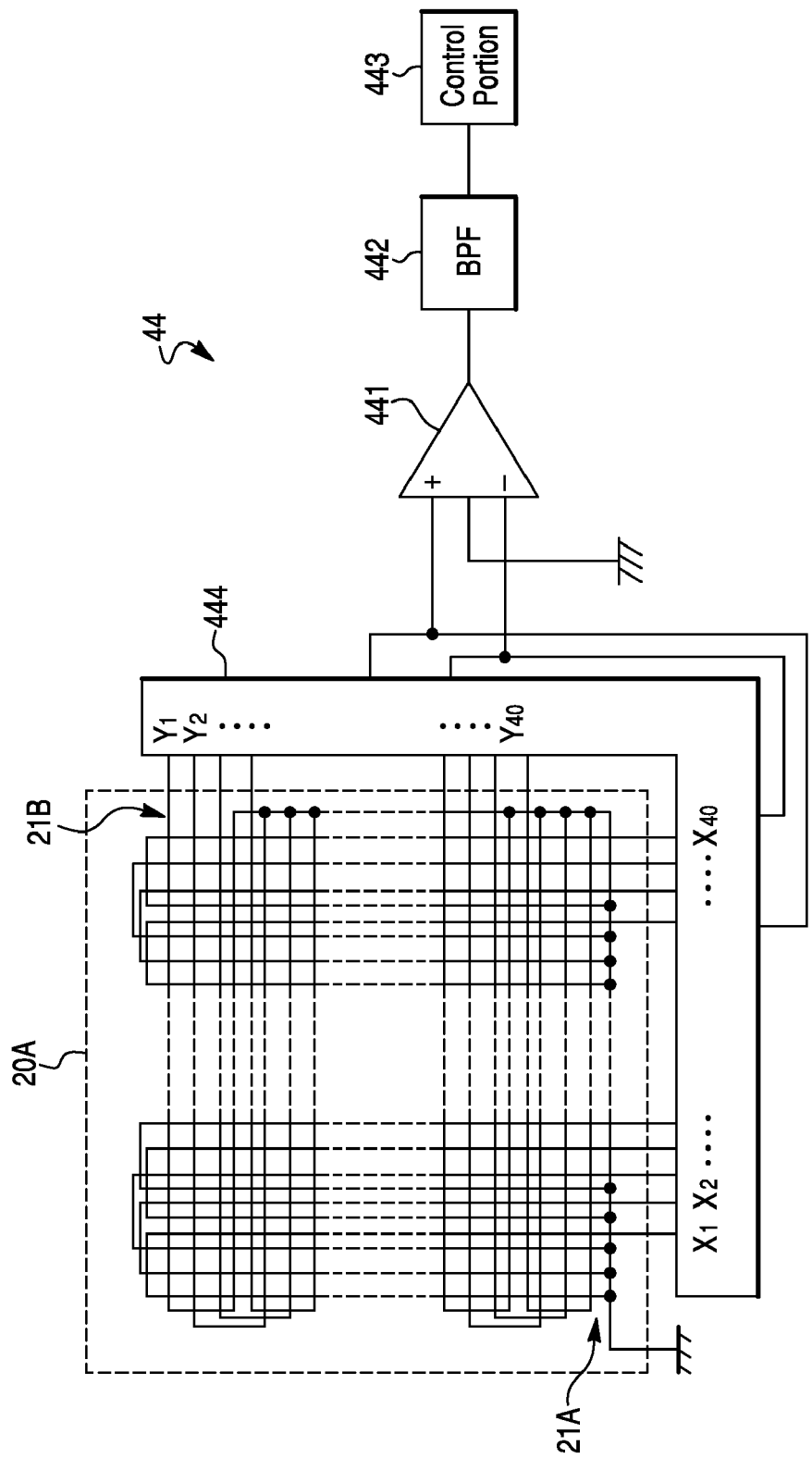
FIG. 18 is a diagram of the internal circuitry of a tablet of the sixth embodiment of the invention.

FIG. 17 shows the configuration of the internal circuit 43 of the position indicator of a sixth embodiment. FIG. 18 shows the configuration of the internal circuit 44 in the tablet of the sixth embodiment. In the internal circuit 43 and internal circuit 44 shown in FIG. 17 and FIG. 18, respectively, portions which are configured similarly to those in the internal circuit 40 (FIG. 3) and the internal circuit 21 (FIG. 4) are assigned the same symbols, and explanations provided above are not repeated below.

In this sixth embodiment, the position indicator 30 incorporating the internal circuit 43 and the tablet 20 incorporating the internal circuit 44 perform detection of indicated positions by electrostatic coupling. A non-equilibrium signal voltage is applied as a reference to the tip conductor 434 of the conductive core 435, as best shown in FIG. 17, which protrudes from the tip of the case 31 (FIG. 2) in the position indicator 30. When an operation is performed in which this conductive core 435 is brought into contact with the surface of the tablet 20, that is, with the input area 20A (FIG. 1), loop coils in the tablet 20 are electrostatically coupled with the conductive core 435. Here, a potential difference appears at each loop coil in the tablet 20, and these potential differences correspond to the distance from the conductive core 435, so that the position of the conductive core 435 can be detected based on the potential differences of a plurality of loop coils.

The configuration of the internal circuit 43 in FIG. 17 is explained.

In the internal circuit 43, a voltage conversion circuit 431 (voltage supply assistance unit) is connected in series between the electrical double-layer capacitor 403 and the power supply terminal Vcc of the controller 401. The voltage conversion circuit 431 is a circuit which converts the voltage across the electrical double-layer capacitor 403 and supplies a power supply voltage to the Vcc terminal of the controller 401. If the rated power supply voltage of the controller 401 is 1.5 V, and if the voltage across the electrical double-layer capacitor 403 is 2.5 V, then the voltage conversion circuit 431 steps down this voltage to 1.5 V, and applies the stepped-down voltage to the power supply terminal Vcc. Also, when for example the voltage across the electrical double-layer capacitor 403 falls to 0.5 V, the voltage conversion circuit 431 steps up this voltage to 1.5 V and supplies the stepped-up voltage to the power supply terminal Vcc.

Control signals from the terminal P1 of the controller 401 are input to the voltage conversion circuit 431, and signals can be transmitted from the voltage conversion circuit 431 to the terminal P2 of the controller 401. When a control signal is input from the terminal P1 of the controller 401, the voltage conversion circuit 431 detects the voltage across the electrical double-layer capacitor 403, and outputs a signal indicating the voltage value to the terminal P2. In this manner, the controller 401 can determine whether charging of the electrical double-layer capacitor 403 is necessary.

In the internal circuit 43, a charging terminal 432 (power transmission unit) is connected to the electrical double-layer capacitor 403. This charging terminal 432 comprises a contact point exposed from the case 31 (FIG. 2) of the position indicator 30. This contact point is connected to a power supply device external to the computer system 10. Hence the electrical double-layer capacitor 403 is charged by this external power supply device.

Upon receiving a power supply voltage from the electrical double-layer capacitor 403, the controller 401 applies a sinusoidal voltage from the terminal P0 to the conductive core 435 protruding from the tip of the case 31 (FIG. 2), based on a clock pulse generated by an oscillator 421. A capacitor 433 is connected in series between the terminal P0 and the conductive core 435, and only a sine-wave component is applied to the conductive core 435. Here, a tip conductor 434 is positioned on the periphery of the conductive core 435, and this tip conductor 434 is connected to a GND terminal of the controller 401.

On the other hand, in the internal circuit 44 incorporated within the tablet 20, each of the loop coils of the loop coil groups 21A, 21B is connected to the multiplexer 444, and this multiplexer 444 is connected to a differential amplifier 441, band-pass filter (BPF) 442, and control portion 443, as best shown in FIG. 18.

The differential amplifier 441 amplifies the differences in the input signals from each loop, connected via the multiplexer 444, and outputs the result to the band-pass filter 442. After removal of noise components from this signal by the band-pass filter 442, the signal is input to the control portion 443. The control portion 443 detects the position of the conductive core 435, that is, the position indicated using the position indicator 30, based on the input signal.

In this way, the invention can be applied in cases of position detection using an electrostatic coupling method. In such cases also, the internal circuit 43 of the position indicator 30 has an electrical double-layer capacitor 403, and this electrical double-layer capacitor 403 can be used as a power supply to drive the controller 401, so that sufficiently strong signals can be transmitted from the internal circuit 43, and moreover battery replacement and other troublesome maintenance is unnecessary.

Further, when a charging terminal 432 to charge the electrical double-layer capacitor 403 is provided, as in the sixth embodiment, by connecting a device which supplies a prescribed DC voltage as an external power supply device to the charging terminal 432, the electrical double-layer capacitor 403 can be charged rapidly. As explained above, the electrical double-layer capacitor 403 can be charged in an extremely short time, and so the external power supply device need only be connected to the charging terminal 432 for a short time. Hence charging is easily performed, and there is no need to provide a special mechanism or the like to maintain contact between the external power supply and the charging terminal 432, and the device can easily be realized at extremely low cost.

In this sixth embodiment, the loop coil groups 21A, 21B may be embedded in the tablet 20 as described above; however, loop coils which do not detract from the viewability of the liquid crystal screen of the tablet 20 may be positioned at the surface of the tablet 20. In this case, there is the advantage that the position indicated by the position indicator 30 incorporating the internal circuit 43 can be detected more stably and reliably.

In the above first through sixth embodiments and the modified examples, the position indicator 30 has been illustrated and discusses as having a pen-type case 31. The invention is not limited to such a configuration, and for example a configuration may be employed using an air-brush type, digitizer cursor type, or mouse-type position indicator or similar, a smaller indicator with a ring shape, or other suitable configurations and designs. Moreover, the position of the coil 412 in the position indicator 30, the position, shape and number of the switches 33 and 34, and other structural features are arbitrary and may be modified without departing from the principals of the invention, as may other details of the configuration be modified.

[Seventh Embodiment]

Figure 19:
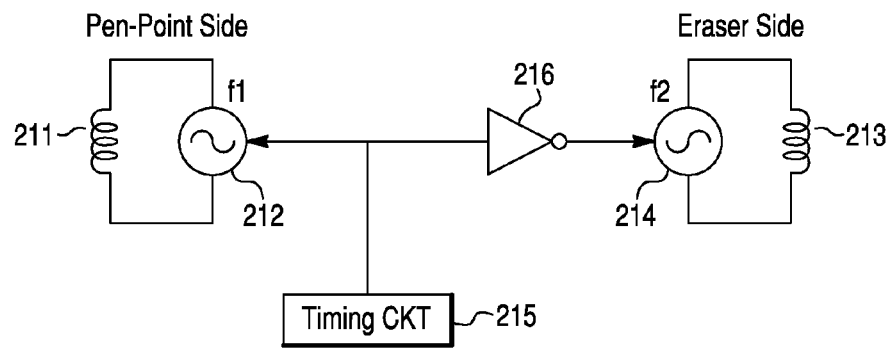
FIG. 19 is an electrical block diagram illustrating a position pointing device according to a seventh embodiment of the present invention.

FIG. 19 of the accompanying drawings is a block diagram showing an arrangement of a position pointing device according to a seventh embodiment of the present invention. In the embodiments which will follow, it is assumed that the position pointing device has two kinds of functions: a pen-point function, characterized by an ability to write information, and an eraser function, characterized by an ability to erase written information. These writing and erasing functions are applicable to a variety of different colors and stroke thicknesses. Although the below description is restricted to dual-function position pointing devices in the interest of brevity, it should be understood that the position pointing devices may be capable of performing three or more functions. It should also be understood that other functions may be practiced in addition to or as alternatives of writing and erasing.

As shown in FIG. 19, the position pointing device according to the seventh aspect of the present invention includes at its pen-point side a signal transmission unit composed of a position pointing coil 211 and an oscillation circuit 212 with an oscillation frequency f1. This position pointing device further includes at its eraser side a signal transmission unit composed of a position pointing coil 213 and an oscillation circuit 214 with an oscillation frequency f2. Also, the position pointing device includes a timing circuit (oscillator) 215 to generate a square-wave signal with a predetermined frequency of which the duty ratio is nearly 50%. An output signal from the timing circuit 215 is directly supplied to the oscillation circuit 212 as a driving signal, and the output signal is also supplied through an inverter 216 to the oscillation circuit 214.

In this circuit, electric power is supplied from a battery (not shown) to respective units of the circuit to permit operation of the respective units. The timing circuit 215 is adapted to generate a clock signal with a frequency having a period sufficiently longer than the time required by the tablet side to detect coordinates of the position pointed by the position pointing device, for example, a clock signal with a frequency of approximately 100 Hz. Thus, when the clock signal from the timing circuit 215 is, held at a high level, the oscillation circuit 212 on the pen-point side may be operated. When on the other hand the clock signal is held at a low level, the oscillation circuit 214 on the eraser side may be operated. Accordingly, in this circuit, it is possible to reduce power consumption of the pen-point side or the eraser side, either of which may be alternately de-energized when not in operation so that only one side is energized at a time.

More specifically, in the seventh embodiment of the present invention, primary factors affecting power consumption are electric power consumed by the oscillation circuit 212 and the position pointing coil 211 connected to the oscillation circuit 212, and electric power consumed by the oscillation circuit 214 and the position pointing coil 213 connected to the oscillation circuit 214. On the other hand, according to the seventh embodiment of the present invention, because the pen-point side and the eraser side are controlled so as to alternately operate, the side not in use is de-energized, and power consumption can be decreased. As a result, an operator is able to freely select the pen-point or the eraser when the position pointing device is in use, while reducing power consumption at the non-selected side. In this manner, the life of the battery can be prolonged.

[Eighth Embodiment]

Figure 20:
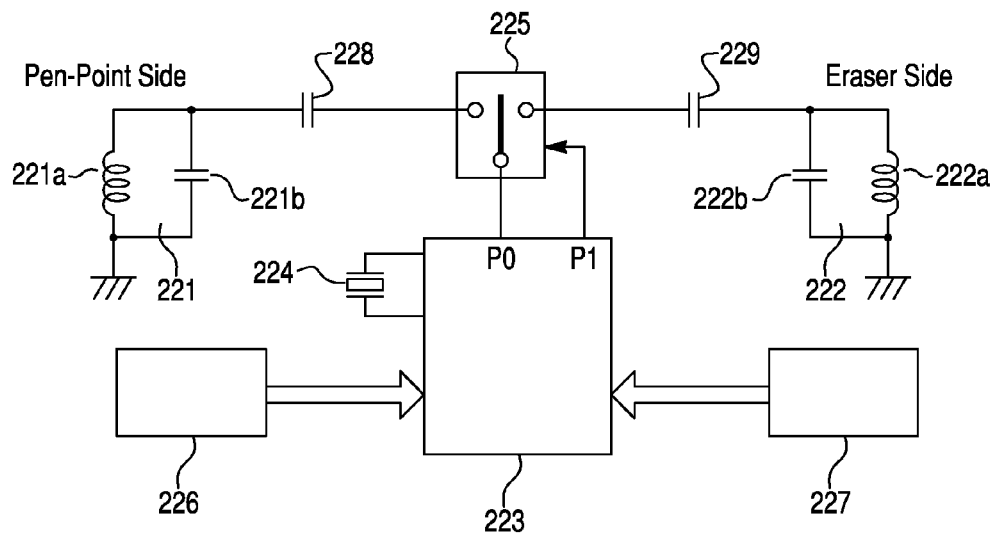
FIG. 20 is an electrical block diagram showing illustrating a position pointing device according to an eighth embodiment of the present invention.

Next, FIG. 20 shows an arrangement of a position pointing device according to an eighth embodiment of the present invention. As shown in FIG. 20, the position pointing device according to the eighth embodiment of the present invention includes at its pen-point side a resonance circuit 221 with a predetermined resonance frequency f2. The resonance circuit 221 is composed of a coil 221a and a capacitor 221b. Also, the position pointing device of FIG. 20 includes at its eraser side a resonance circuit 222 with a predetermined resonance frequency f0. The resonance circuit is composed of a coil 222a and a capacitor 222b. A microprocessor, generally depicted by reference numeral 223 in FIG. 20, includes a ROM (read-only memory) and a RAM (random-access memory), although not shown, and this microprocessor 223 is able to operate in accordance with previously-set predetermined programs.

Also, an oscillator 224 with the above-described frequency f0 is connected to the microprocessor 223 to generate a driving clock signal of the microprocessor 223 and signals with the frequency f0 which are radiated from the resonance circuits 221 and 222. As a result, while the signal with the above-described frequency f0 is outputted from a terminal P0 of the microprocessor 223 at predetermined timing, the output signal from the terminal P0 is supplied at any one time to only one of the resonance circuit 221 of the pen-point side and the resonance circuit 222 of the eraser side.

In the embodiment illustrated in FIG. 20, detecting units 226 and 227 are adapted to detect the pressure that the operator puts on the stylus pen when touching the position detecting tablet with the stylus pen. This pressure will hereinafter be simply referred to as a "stylus pressure" and the detecting units 226 and 227 will hereinafter be referred to as a "stylus pressure detecting unit 226" and a "stylus pressure detecting unit 227," respectively. The stylus pressure detecting units 226 and 227 are connected to the microprocessor 223. These stylus pressure detecting units 226 and 227 may output detected stylus pressures in the form of 8-bit digital values and the microprocessor 223 may be operated so as to regularly read these digital values. The microprocessor 223 outputs a signal to control an analog switch 225 to a terminal P1 based on the read signals. In FIG. 20, reference numerals 228 and 229 denote coupling capacitors, respectively.

Consequently, the analog switch 225 supplies a signal to the pen-point side when the signal from the terminal P1 of the microprocessor 223 is held at a low level, and analog switch 225 supplies a signal to the eraser side when the signal from the terminal P1 is held at a high level. In this circuit, respective units are supplied with and energized by electric power from a battery, not shown. Accordingly, also in this circuit, power consumption by the sides which are alternately de-energized can be reduced. Thus, the operator can freely choose between the pen-point side and the eraser side when the position pointing device is in use. Also, power consumption can be decreased and life of the battery can be prolonged by de-energizing the unselected (pen-point or eraser) side.

Figure 21:
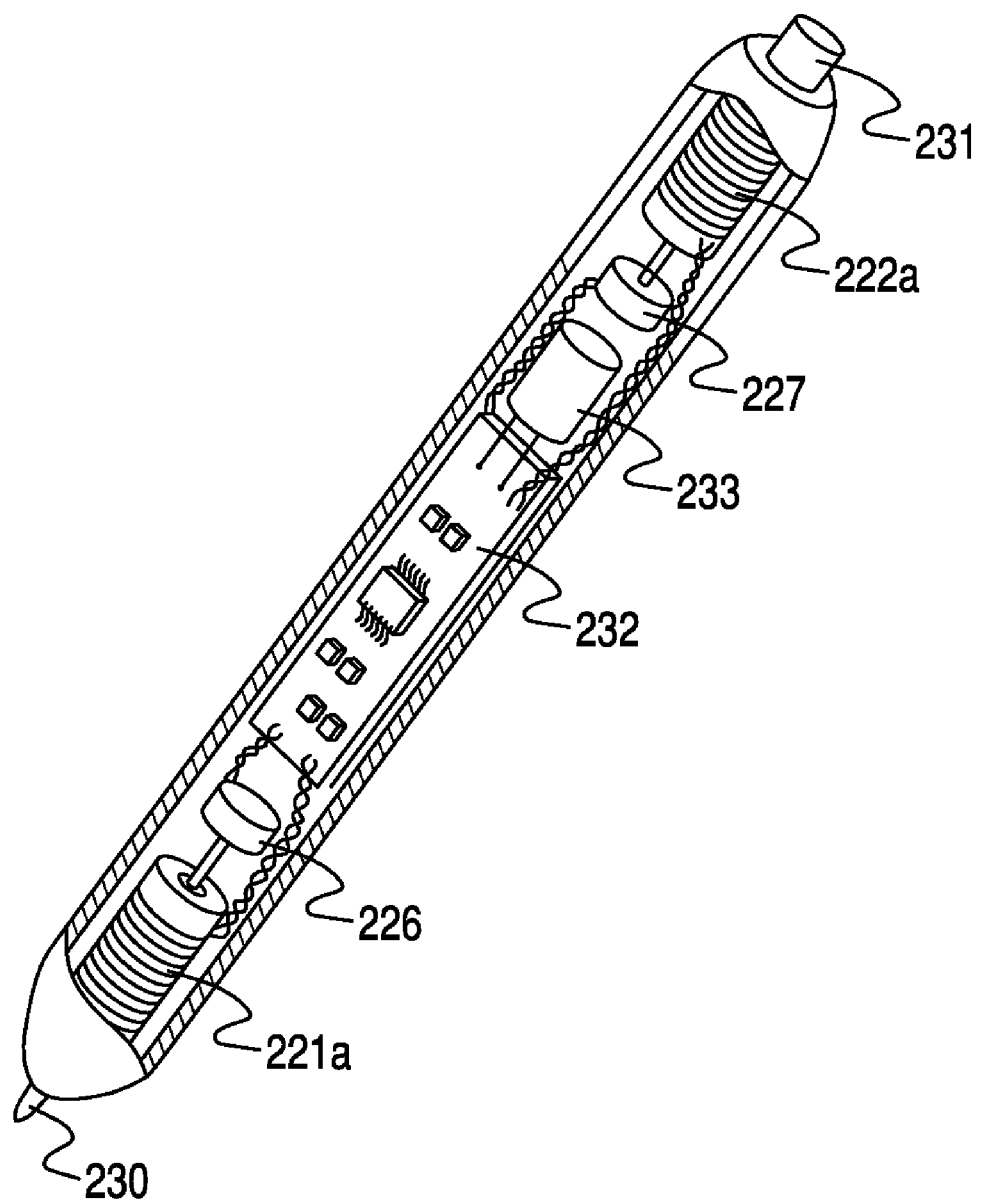
FIG. 21 is a perspective, fragmentary cross-sectional view of a position pointing stylus pen serving as the above-mentioned position pointing device of the eighth embodiment of the present invention.

FIG. 21 is a cross-sectional view partially in perspective showing a specific arrangement of a position pointing stylus pen which may serve as the above-mentioned position pointing device of the eighth embodiment of the present invention. As shown in FIG. 21, a pen-point 230 is provided at the lower left end portion of FIG. 21 and an eraser 231 is provided at the upper right end portion of FIG. 21. It should be noted that the illustrated pen-point 230 and eraser 231 imitate writing instrument components. The pen point 230 and eraser are preferably formed of resin materials. Coils 221*a* and 222*a*, which serve as position pointing coils, are provided in the vicinity of the pen-point 230 and eraser 231, respectively.

The pen-point 230 and eraser 231 are connected at their inner end portions to the stylus pressure detecting units 226 and 227, respectively. Stylus pressures obtained when the pen-point 230 and the eraser 231 are depressed are transmitted to the stylus pressure detecting units 226 and 227 and thereby the stylus pressures can be detected. Then, the thus detected stylus pressures are converted into 8-bit digital values, for example, and supplied to the microprocessors 223 (not shown in FIG. 21) provided on a circuit board 232. It should be noted that the illustrated position pointing stylus pen includes a built-in battery 233 to supply electric power to suitable units such as the microprocessor 223 on the circuit board 232.

Operations of the position pointing device according to the eighth embodiment of the present invention will be described with reference to waveform diagrams of FIGS. 22A, 22B and 22C.

FIG. 22A is a diagram of a waveform of signals to which reference will be made in explaining operations of the position pointing device when the operator operates the pen-point side. The microprocessor 223 reads output data from the stylus pressure detecting unit 226. If the stylus pressure of the pen-point side is greater than a predetermined stylus pressure, then the microprocessor 223 fixes the terminal P1 at a low level and outputs a signal from the terminal P0 at timing shown in FIG. 22A. This signal outputted from the terminal P0 is a signal with a frequency nearly equal to the resonance frequency f0 of the resonance circuit 221 as mentioned hereinbefore. This signal is intermittently transmitted at the cycle of 150 μs after the continuous transmission period in which the above signal is continuously transmitted during the period longer than a constant period.

This intermittent transmission period occurs 9 times per cycle in which 1 bit to distinguish the pen-point side and the eraser side is added to 8 bits of stylus pressure information, i.e., 9 bits in total are transmitted consecutively. As shown in FIG. 22A, according to this embodiment, a signal is transmitted if transmitted data is "0" and a signal is not transmitted if transmitted data is "1". Thus, "0" or "1" may be represented. Accordingly, the tablet side is able to receive signals in accordance with these timings and it is able to detect transmitted data from the position pointing device in response to "0" obtained if a signal is detected and "1" obtained if a signal is not detected.

Also, FIG. 22B is a diagram of waveforms of signals to which reference will be made in explaining operations of the position pointing device when the operator operates the eraser side. The microprocessor 223 reads output data from the stylus pressure detecting unit 227. If the stylus pressure of the eraser side is greater than a predetermined stylus pressure, then the microprocessor 223 fixes the terminal P1 at a high level and outputs a signal from the terminal P0 at timing shown in FIG. 22B. This signal is supplied to the resonance circuit 222 (FIG. 2) at exactly the same timing as that shown in FIG. 22A and then it is radiated. The operations shown in FIG. 22B differ from the operations of the pen-point side shown in FIG. 22A only in that the final bit of the transmitted data is "1".

Consequently, the tablet side is able to determine that the received result of this final data is "1" and further is able to recognize that the received signal should be transmitted from the eraser side.

FIG. 22C is a diagram of signal waveforms to which reference will be made in explaining operations of the position pointing device when the stylus pressure detects, for both the pen-point side and the eraser side, results that are less than the predetermined value. The position pointing device may alternately carry out the operations of the pen-point side (FIG. 22A) and the operations of the eraser side (FIG. 22B) by alternately switching the terminal P1 to the high level and the low level. However, 8 bits of stylus pressure information shown in FIG. 22C are all "0".

As described above, according to this embodiment, because the one-bit portion of the signal is intermittently transmitted after the continuous transmission period in which the 8-bit portion of the signal is continuously transmitted during a time period longer than the constant time, the tablet side is able to easily operate with timing matched with that of the position pointing device. Also, the pen-point side and the eraser side can be distinguished from one another by only one frequency. The pen-point side and the eraser side are alternately operated when the operator operates neither the pen-point side nor the eraser side. Accordingly, the tablet side is able to detect which of the pen-point side or the eraser side is operated irrespective of which side is operated first and hence the operator can choose from the pen-point and the eraser freely when the position pointing device is in use.

In the above-mentioned position pointing device, a primary source of the consumption of electric power is the electric power supplied to and consumed by the resonance circuits 221 and 222 from the terminal P0 of the microprocessor 223 through the analog switch 225. This problem is largely overcome by the present embodiment. Because at any time only one of the resonance circuits 221 or 222 is energized and the other is de-energized under control of the analog switch 225, power consumption of the position pointing device can be decreased and life of the battery can be prolonged.

When the pen-point side stylus pressure and the eraser side stylus pressure both are less than a predetermined value, the position pointing device may, after a given or predetermined time period, move to the alternate operations mode shown in FIG. 22C. The reason for movement to the alternate operations mode is that, when the position pointing device is in ordinary use, the operator is unable to suddenly switch the pen-point side to the eraser side. In actual manipulation, the operator may frequently and repeatedly use the position pointing device in such a manner as to operate the pen-point side or the eraser side with or without stylus pressure greater than the constant value. As a result of the alternate operations mode, the operator is able to operate the position pointing device smoothly.

Further, while the pen-point side and the eraser side are switched under control of the analog switch 224 in this embodiment of the present invention, the present invention is not limited thereto. For example, the microprocessor 223 may include two terminals by which the signal with the frequency f0 can be outputted and the signal may be outputted from either one of the two terminals. In that case, the microprocessor 223 may switch therein the outputs to the two terminals by using the signal outputted to the terminal P1. In this case, extra analog switch 225 need not be provided and the microprocessor 223 may have the same number of terminals as sides.

While switching between the pen-point side and the eraser side is based on detections of the stylus pressures in the above-described eighth embodiment of the present invention, the present invention is not limited thereto. Switching can be switched based on other detectors, as described below.

[Ninth Embodiment]

Figure 23:
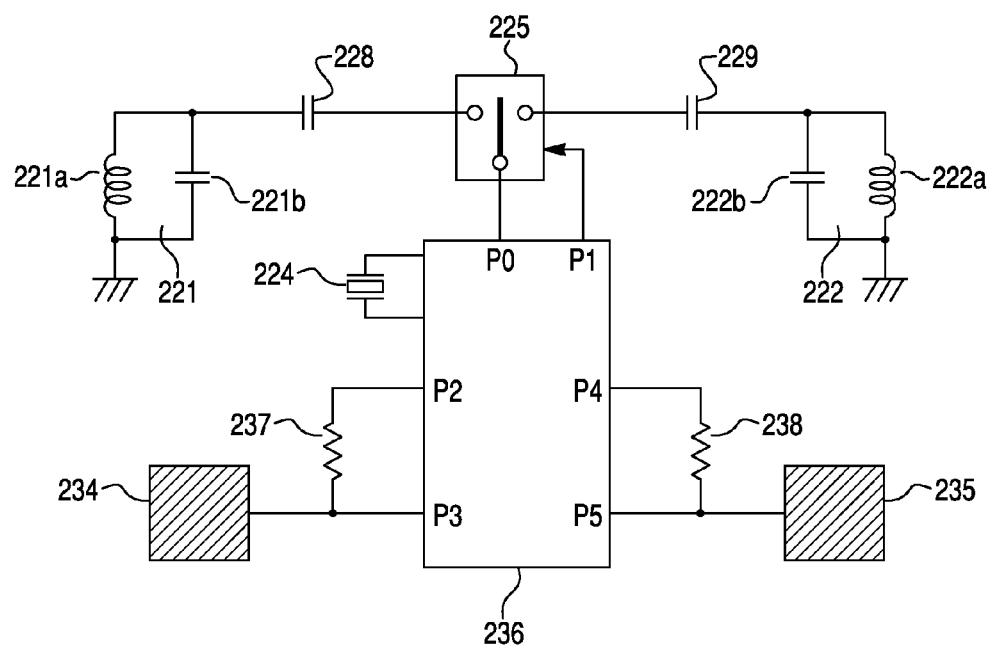
FIG. 23 is an electrical block diagram illustrating a position pointing device according to a ninth embodiment of the present invention.

FIG. 23 shows an arrangement of a position pointing device according to a ninth embodiment of the present invention using touch-sensitive sensors as the above-mentioned detectors. In FIG. 23, elements and parts identical to those of FIG. 20 are denoted by identical reference numerals and therefore the description of common features is not repeated hereinbelow.

Specifically, as shown in FIG. 23, the position pointing device according to this ninth embodiment includes electrodes 234 and 235 serving as touch-sensitive sensors, and square-wave output signals are supplied from the terminals P2 and P4 of the microprocessor 236 to these electrodes 234 and 235, respectively. The electrodes 234 and 235 are connected to terminals P3 and P5, respectively, of the microprocessor 236 and thereby electric potential is detected. Also in this circuit, electric power is supplied from a battery, not shown, and thereby respective units of the microprocessor 236 and the like can be operated.

Figure 24A:
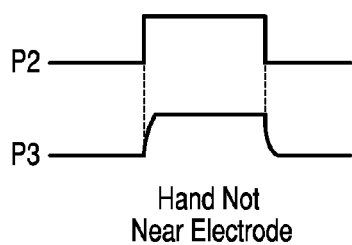
FIGS. 24A and 24B are waveform diagrams of signals to which reference will be made in explaining operations of the position pointing device according to the ninth embodiment of the present invention.
Figure 24B:
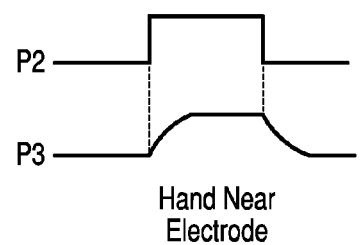

Examples of the operation of this ninth embodiment of the present invention are described below. If the operator's hand is not near the electrode 234, then the square-wave signal outputted from the terminal P3 is slightly deteriorated in waveform, as shown in FIG. 24A. This deterioration is detected at the terminal P3. On the other hand, if the operator's hand is near the electrode 234, then the square-wave signal outputted from the terminal P2 is considerably deteriorated in waveform, as shown in FIG. 24B, and the deterioration is detected at the terminal P3. Accordingly, it is possible for the microprocessor 236 by analyzing the change of the waveform to determine which of the electrodes 234 and 235 is near the hand of the operator.

Figure 25:
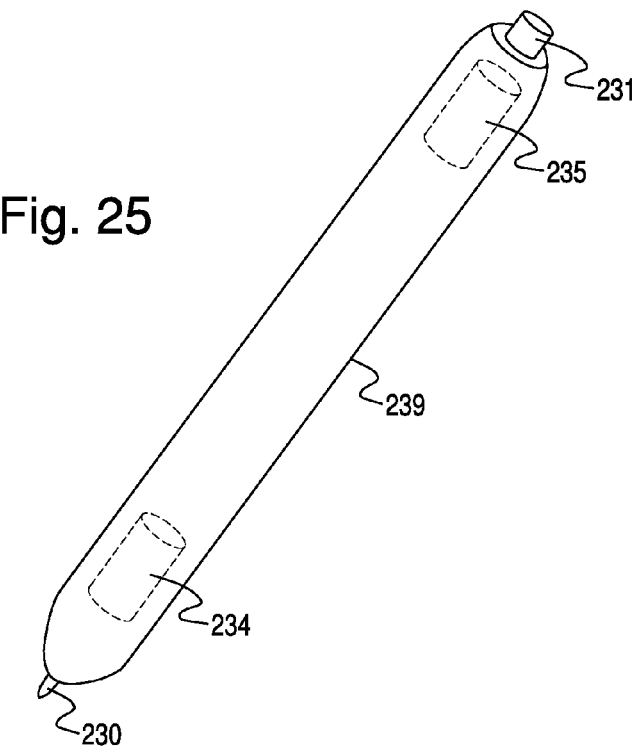
FIG. 25 is a perspective view of a position pointing stylus pen serving as the above-mentioned position pointing device according to the ninth embodiment of the present invention.

FIG. 25 is a perspective view showing an example of a position pointing stylus pen 239 serving as the above-mentioned position pointing device of the ninth embodiment of the present invention. Specifically, as shown in FIG. 25, the position pointing stylus pen 239 includes the above-mentioned electrodes 234 and 235 provided near the pen-point 230 and the eraser 231, respectively. The electrode 234 is positioned where the fingers of the operator grip the position pointing stylus pen 239 for writing mode, and the electrode 235 is situated where the fingers of the operator grip the position pointing stylus pen 239 for erasing mode. The remainder of the inside structure of this position pointing stylus pen 239 is substantially equivalent to the position pointing stylus pen described above, e.g., in which the microprocessor 236 is provided on the circuit board 235, with the exception that the stylus pressure detecting units 226 and 227 present in the arrangement shown in FIG. 21 are excluded and therefore need not be illustrated and described with respect to this embodiment.

Accordingly, in the ninth embodiment of the present invention, when the operator operates the position pointing device 239 to employ the pen-point 230 or the eraser 231, the location at which the operator's fingers grip the device 239, i.e., near the electrode 234 or 235, determines the side of the device 239 which is being used on the tablet. As a result, the position pointing device 239 can execute processing operations similar to those described above with reference to FIGS. 22A, 22B, and 22C. It should be noted that the direction of the pen-point 230 or the eraser 231 can be determined by changing the oscillation frequency.

[Tenth Embodiment]

Figure 26:
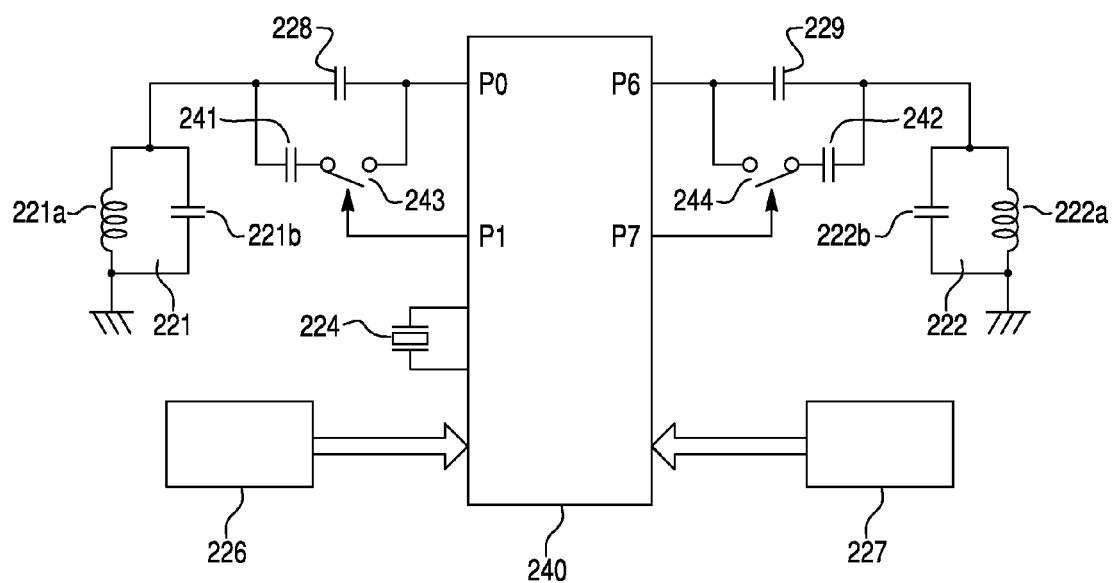
FIG. 26 is an electrical block diagram illustrating a position pointing device according to a tenth embodiment of the present invention.

Further, FIG. 26 is a block diagram showing an arrangement of a position pointing device according to a tenth embodiment of the present invention. In the following description with reference to FIG. 26, elements and parts identical to those of FIG. 20 are denoted by identical reference numerals.

Specifically, as shown in FIG. 26, the pen-point side includes the resonance circuit 221 with the predetermined resonance frequency f0. The resonance circuit 221 includes the coil 221a and the capacitor 221b. The eraser side includes the resonance circuit 222 with the predetermined frequency f0. The resonance circuit 222 includes the coil 222a and the capacitor 222b. Further, a microprocessor, generally depicted by reference numeral 240 in FIG. 26, includes a ROM (read-only memory) and a RAM (random-access memory), although not shown. The microprocessor 240 can be operated in accordance with previously-set predetermined programs.

Also, the oscillator 224 with the above-described frequency f0 is connected to this microprocessor 240 to generate a driving clock signal of the microprocessor 240 and to generate the signal with the frequency f0 which is to be radiated from the resonance circuits 221 and 222. As a consequence, the signals with the above-described frequency f0 are outputted from the terminals P0 and P6 of the microprocessor 240 at predetermined timings, and the output signals from these terminals P0 and P6 are supplied through capacitors 228 and 229, respectively, to the pen-point side resonance circuit 221 and the eraser side resonance circuit 222, respectively.

Further, capacitors 241 and 242 are respectively connected to the above-mentioned capacitors 228 and 229, and analog switches 243 and 244 are respectively connected to the capacitors 241 and 242 in series. The analog switches 243 and 244 are driven under control of the signals from the terminals P1 and P7 of the microprocessor 240. It should be noted that the analog switches 243 and 244 are respectively energized when the signals from the terminals P1 and P7 of the microprocessor 240 are held at a high level.

The microprocessor 240 is connected to the stylus pressure detecting unit 226 for detecting the stylus pressure obtained when the operator operates the position pointing device at its pen-point side. The microprocessor 240 is also connected to the stylus pressure detecting unit 227 for detecting the stylus pressure obtained when the operator operates the position pointing device at its eraser side. These stylus pressure detecting units 226 and 227 each are adapted to output detected stylus pressures in the form of 8-bit digital values, and the microprocessor 240 is adapted to regularly read these values. The microprocessor 240 outputs signals to control the analog switches 243 and 244 to the terminals P1 and P6 based on the read out signals.

When the signal from the terminal P1 of the microprocessor 240 is held at a low level, the analog switches 243 and 244 allow the capacitors 228 and 241 to be connected in parallel to each other to thereby raise the signal supplied to the resonance circuit 221 of the pen-point side in level. When the signal from the terminal P7 of the microprocessor 240 is held at a low level, the analog switches 243 and 244 allow the capacitors 229 and 242 to be connected in parallel to each other to thereby raise the signal supplied to the resonance circuit 222 of the eraser side in level. It should be noted that, also in the circuit shown in FIG. 26, electric power for operation of the units is supplied from a battery (not shown) to the respective units.

Operations of the position pointing device having the above-mentioned arrangement according to the tenth embodiment of the present invention will be described below. The signal with the frequency f0 is outputted from the terminal P0 of the microprocessor 240 at the same timing as that shown in FIG. 22A, and the signal is supplied through the capacitor 228 to the resonance circuit 221. In a like manner, the signal with the frequency f0 also is outputted from the terminal P6 of the microprocessor 240 at the same timing as that shown in FIG. 22B and the signal is supplied through the capacitor 229 to the resonance circuit 222. The signals from these terminals P0 and P6 are outputted at the same time and the signal with the frequency f0 is constantly supplied to the resonance circuits 221 and 222.

Then, in this embodiment, the detected result obtained by the stylus pressure detecting unit 226 is transmitted from the terminal P0 and the detected result obtained by the stylus pressure detecting unit 227 is transmitted from the terminal P6. While the signals are transmitted from both of the pen-point side and the eraser side, the tablet is able to detect a signal with the higher level from either the pen-point side or the eraser side.

In this embodiment, the capacitor 241 is connected in parallel to the capacitor 228 through the analog switch 243. Similarly, the capacitor 242 is connected in parallel to the capacitor 229 through the analog switch 244. Further, the microprocessor 240 regularly reads an output value from the stylus pressure detecting unit 226 that detects pressure of the pen-point applied when the operator operates the position pointing device at its pen-point side, and an output value from the stylus pressure detecting unit 227 that detects pressure of the eraser applied when the operator operates the position pointing device at its eraser side.

Accordingly, if the stylus pressure of the pen-point side (output value from the stylus pressure detecting unit 226) is greater than a predetermined value, then the microprocessor 240 sets the terminal P1 to a high level to energize the analog switch 243. As a result, capacitive coupling generated when the signal outputted from the terminal P0 is supplied to the resonance circuit 221 is increased. Power of the signal transmitted from the resonance circuit 221 is thereby increased.

On the other hand, if the stylus pressure of the eraser side (output value from the stylus pressure detecting unit 227) is greater than a predetermined value, then the microprocessor 240 sets the terminal P7 to a high level to energize the analog switch 244. As a result, capacitive coupling generated when the signal outputted from the terminal P6 is supplied to the resonance circuit 222 is increased. Power of the signal transmitted from the resonance circuit 222 is thereby increased.

Accordingly, in this embodiment, transmission power of the operated side can be increased by the aforementioned operations and hence it is possible for the tablet side to detect a signal stably. Also, because power of the side which is not operated can be suppressed to the minimum, power consumption can be decreased and life of the battery can be prolonged. It should be noted that, if the stylus pressure of one side is greater than a predetermined value, then transmission of a signal from the other side may be stopped completely.

However, in this embodiment, if transmission of a signal from one side is stopped completely, then when the position pointing device is quickly switched in operation from the pen-side to the eraser side or vice versa, a problem arises. Specifically, the tablet side becomes unable to detect a signal obtained immediately after switching from one side to another, because the side switched to is not sending any signal. That is, the position pointing device experiences a delay in the recognition of the switch operation. However, if a signal is transmitted with small power from the side not in operation, then the position pointing device can manage the above-mentioned quick switching of operation and hence the device can recognize switching of operation immediately. It should be noted that, although stability of detected coordinates is lowered during the first very short time period, stability of detected coordinates can be improved as the position pointing device transitions to ordinary power.

[Eleventh Embodiment]

Figure 27:
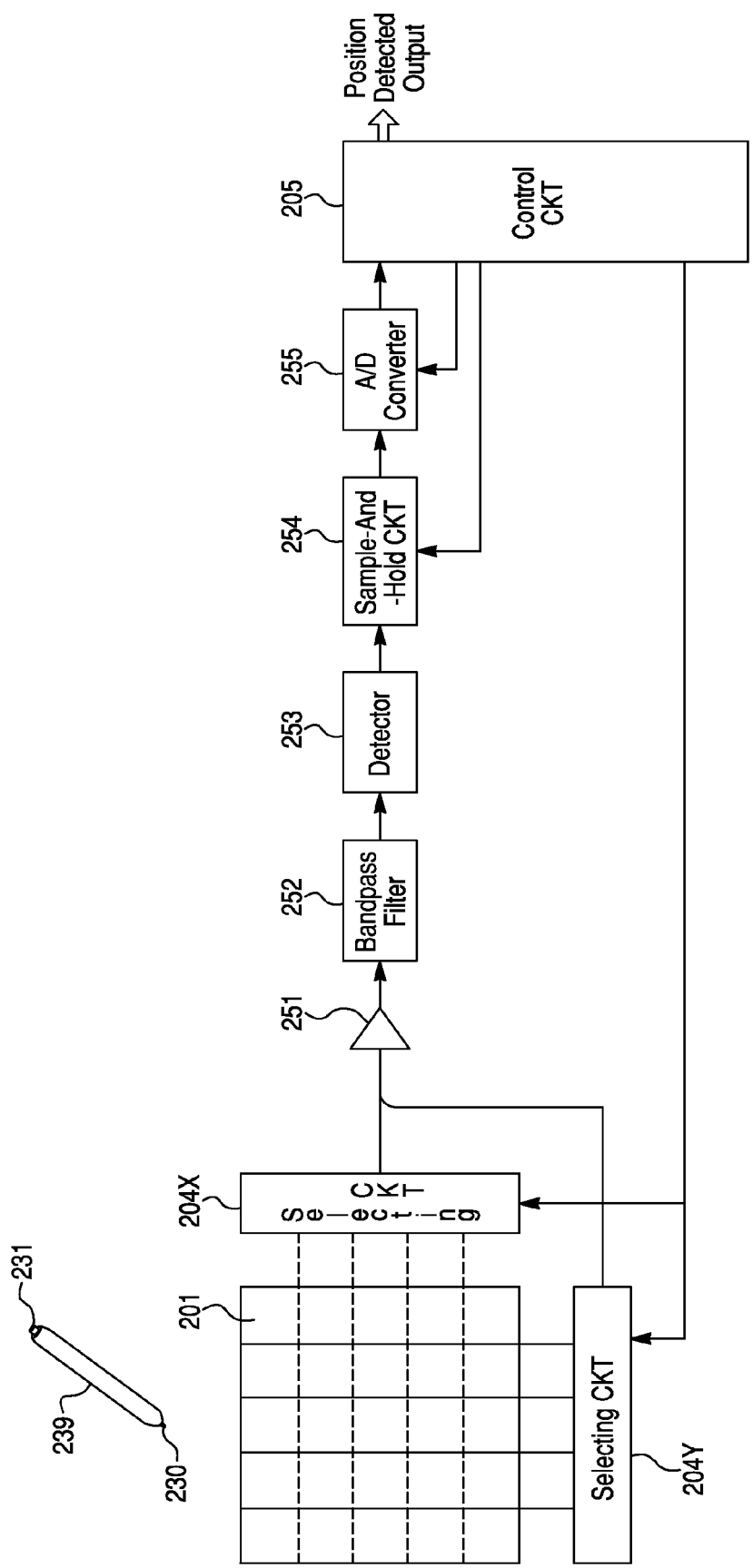
FIG. 27 is an electrical block diagram illustrating a position detecting apparatus and a computer according to an eleventh embodiment of the present invention.

FIG. 27 is a block diagram showing arrangements of a position input system and a computer system according to an eleventh embodiment of the present invention. The position input system and computer system of FIG. 27 are compatible with the position pointing devices of various embodiments described above, including, but not necessarily limited to, the seventh to tenth embodiments.

As best shown in FIG. 27, the position detecting apparatus according to this embodiment includes a sensor coil group 201 composed of a plurality of loop coils, for example. In this sensor coil group 201, in order to detect the position in the X-axis direction and the position in the Y-axis direction, long sides of loop coils (shown by only lines for simplicity) for effecting electromagnetic induction are provided so as to cross each other as shown in FIG. 27. It should be noted that solid-line (X-axis) loop coils and broken-line (Y-axis) loop coils in FIG. 27 are provided on different layers. The position pointing pen 239 having the above-mentioned pen-point 230 and eraser 231 is moved close to the sensor coil group 201 when this position input system is in use.

Also, a plurality of loop coils forming the sensor coil group 201 is sequentially provided in an overlapping fashion such that wirings of coils are provided at a predetermined pitch. Further, end portions of the loop coils in each layer are connected to a selecting circuit 204X or a selecting circuit 204Y and hence those loop coils are sequentially selected, scanned and driven by the selecting circuit 204X or 204Y. It should be noted that the selecting circuit 204X or 204Y may select those loop coils in accordance with a control signal from a control circuit 205. Accordingly, the control circuit 205 is able to constantly recognize the position of the loop coil selected within the sensor coil group 201.

A signal received at the loop coil selected by the above-mentioned selecting circuit 204X or 204Y is supplied through a common amplifier 251 to a bandpass filter (BPF) 252 which passes the above-mentioned specific frequency f0, and a signal passed through the bandpass filter 252 is supplied to a detector 253. Further, a signal detected by the detector 253 is supplied through a sample-and-hold (S/H) circuit 254 to an analog-to-digital (A/D) converter 255, and a signal, which was converted from an analog signal to a digital signal by the A/D converter 255, is inputted to the control circuit 205. As a result, the control circuit 205 can recognize magnitude of a received signal and the position of the loop coil which receives a signal.

Therefore, according to the arrangement shown in FIG. 27, the control circuit 205 can detect the position at which the position pointing pen 239 is moved close to the sensor coil group 201 and can function as the position detecting apparatus. Also, if the control circuit 205 is provided as a central processing unit (CPU) for carrying out processing based on an arbitrary program, then the position detecting apparatus can constitute part of a computer system for carrying out processing for detecting the position at which the position pointing pen 239 approaches the sensor coil group 201. In this case, if the resonance circuits built into the position pointing pens 239 are operated one at a time under the control of the control circuit 205, then power consumption can be decreased and the life of the built-in battery can be prolonged.

As described above, the position pointing device of several of the above-described embodiments of the present invention includes a built-in power supply unit for transmitting a signal to point at least the position to a position detecting tablet. This position pointing device includes signal transmitting units provided at a plurality of portions of the position pointing device and a control unit for controlling a plurality of signal transmitting units such that the units are in an energized or de-energized state. Consequently, power consumption in the position pointing device can be decreased and life of the built-in battery can be prolonged.

Also, according to the position pointing device of several of the above-described embodiments of the present invention, a built-in power supply unit transmits a signal to point at least the position of the position pointing device to a position detecting tablet. This position pointing device includes signal transmitting units provided at a plurality of portions of the position pointing device and a power control unit for controlling transmission power of a plurality of signal transmitting units at least in two levels. Consequently, power consumption in the position pointing device can be decreased and life of the built-in battery can be prolonged.

Further, according to the position detecting apparatus of several of the above-described embodiments of the present invention, the position input system includes a position pointing device having a built-in power supply unit to transmit a signal to provide positioning information to a position detecting tablet, a plurality of signal transmitting units provided at a plurality of portions, and a power control unit for controlling transmission power to a plurality of signal transmitting units. The position detecting tablet includes a discriminating unit for discriminating signals from the plurality of signal transmitting units, and the position detecting apparatus outputs information based on the positioning information from the position pointing device and discrimination information from the discriminating unit. Thus, power consumption in the position pointing device can be decreased and life of the built-in battery can be prolonged.

Furthermore, according to several of the above-described embodiments of the present invention, a computer system is provided which includes a position pointing device having a built-in power supply unit to transmit a signal identifying at least the position of the position pointing device relative to a position detecting tablet, signal transmitting units provided at a plurality of portions, a power control unit for controlling transmission power to a plurality of signal transmitting units, the position detecting tablet, and a computer. The position detecting tablet includes a discriminating unit for discriminating each of signals from a plurality of signal transmitting units and the computer executes processing corresponding to positioning information from the position pointing device and based on discrimination information from the discriminating unit.

It should be noted that the present invention is not limited to the above-described embodiments. Also, the two functions—pen-point function (writing of information) and the eraser function (erasing of written information) of this position pointing device—are compatible with written information of different colors and of different thickness. Furthermore, the position pointing device according to the various embodiments of the present invention can include two, three, or more than three functions, with each "side" operated alternately so that only one side is powered at an operational level at a time, and so that the other side(s) is either not powered or operated at a decreased power.

It should be understood by those skilled in the art that various modifications, combinations, sub-combinations and alterations may occur depending on design requirements and other factors, insofar as they are within the scope of the appended claims or the equivalents thereof.

What is claimed is:

1. A position input system, comprising:
a position indicator for transmitting signals;
and a position detector device for receiving signals transmitted from the position indicator,
wherein said position indicator comprises a power transmission unit for receiving power supplied thereto from outside of said position indicator, a controller to which a predetermined driving voltage is supplied, a charging capacitor into which driving power for said controller is charged through said power transmission unit, a voltage detection unit for detecting a driving voltage supplied to said controller and outputting an output signal corresponding to the detected driving voltage, and a switch provided between the charging capacitor and said controller and configured to perform energization control in response to the output signal from said voltage detection unit.

2. A position indicator for use with a position detecting device to detect a position indicated by the position indicator on the position detecting device, comprising:

a position indicator including a power transmission unit for relaying power supplied thereto from outside of said position indicator, a controller to which a predetermined driving voltage is supplied, a resonance circuit for radiating an alternating magnetic field in response to a signal outputted from said controller, comprising:
- a charging capacitor,
- a voltage detection unit for detecting a driving voltage supplied to said controller and outputting an output signal corresponding to the detected driving voltage, and
- a switch provided between the charging capacitor and said controller, said switch configured to perform energization control in response to the output signal from said voltage detection unit.

3. The position indicator according to claim 2, wherein said controller is operably associated with the position indicator, and wherein the capacitor drives the controller.

4. The position indicator according to claim 3, further comprising a light emitting portion for issuing a notification that charging is required in response to the output signal of said voltage detection unit.

5. The position indicator according to claim 3, wherein the voltage detection unit is electrically connected to the controller.

6. The position indicator according to claim 2, wherein the voltage detection unit is electrically connected to the charging capacitor.

7. The position indicator according to claim 2, wherein the power transmission unit receives an AC signal supplied from the outside to said position indicator, and said position indicator further comprises a rectification circuit for rectifying the AC signal received by said power transmission unit, power being supplied contactlessly to said position indicator by the AC signal to charge said charging capacitor through the rectification circuit.

8. The position indicator according to claim 2, wherein the resonance circuit comprises a coil and a capacitor.

9. The position indicator according to claim 2, wherein the capacitor comprises an electrical double layer capacitor.

10. The position indicator according to claim 2, further comprising a voltage increase circuit for increasing the charged voltage level of the charging capacitor.

11. The position indicator according to claim 2, further comprising terminals for charging the capacitor.

12. The position indicator according to claim 2, further comprising a driving voltage stabilizing capacitor connected between said switch and said controller for stabilizing the driving voltage to be supplied to the controller.

13. The position indicator according to claim 2, further comprising a pressure detecting unit for detecting stylus pressure information including a variable capacitor having capacitance which varies in response to a magnitude of force applied to said pressure detecting unit.

14. A position input system for detecting a position indicated by a position indicator on a position detecting device, the system comprising:
- a power supply;
- a position indicator including a power transmission unit for relaying power supplied thereto from outside of said position indicator, a controller to which a predetermined driving voltage is supplied, a resonance circuit for radiating an alternating magnetic field in response to a signal outputted from said controller, comprising
  - a charging capacitor,
  - a voltage detection unit to detect a driving voltage supplied to said controller and outputting an output signal corresponding to the detected driving voltage, and
  - a switch provided between the charging capacitor and said controller and configured to perform energization control in response to the output signal from said voltage detection unit, wherein the charged voltage of said charging capacitor is supplied as the predetermined driving voltage to said controller by the energization control of said switch, and
- a position detecting device comprising a predetermined input area for receiving a signal transmitted from said position indicator to detect a position on said predetermined input area pointed to by said position indicator.

15. The position input system according to claim 14, wherein the capacitor drives the controller.

16. The position input system according to claim 15, wherein the power supply comprises a magnetic field generation unit.

17. The position input system according to claim 16, wherein the power supply charges the capacitor with a magnetic field generated by the magnetic field generation unit.

18. The position input system according to claim 14, wherein the position detecting device generates a user notification based upon the output signal from said voltage detection unit.

19. The position input system according to claim 18, further comprising a display panel which functions as said input area, and a position inputting operation by said position indicator is carried out on said display panel while the user notification that charging into said position indicator is required is notified on the display.

20. The position input system according to claim 19, wherein the display panel and the position detecting device are integrated into a tablet-type computer.

21. The position input system according to claim 18, wherein the user notification comprises a charging request message.

22. The position input system according to claim 18, wherein the user notification comprises activating or flashing an LED.

23. The position input system according to claim 14, wherein the power supply comprises a detection switch to be activated when the position indicator is placed in a charging position of the power supply.

24. The position input system according to claim 14, wherein the power supply is integrated with the position detecting device.

25. The position input system according to claim 14, wherein the power supply provides power to the charging circuit based at least in part on the output signal from said voltage detection unit.

26. The position input system according to claim 14, wherein the position indicator is inserted into an opening of the position detecting device and the capacitor is charged by a magnetic field generated by the power supply.

27. The position input system according to claim 14, wherein the power supply comprises a stand for setting the position indicator.

28. A method of charging a position indicator comprising the steps of:
- providing a position detector device comprising a predetermined input area for receiving a signal transmitted from said position indicator to detect a position on said predetermined input area pointed to by said position indicator;

providing a position indicator including a power transmission unit for relaying power supplied thereto from outside of said position indicator, a controller to which a predetermined driving voltage is supplied, a resonance circuit for radiating an alternating magnetic field in response to a signal outputted from said controller, wherein position indication is carried out by the alternating magnetic field radiated from said resonance circuit, said position indicator further comprising a charging capacitor;

providing a power supply external to the position indicator;

detecting a voltage status of the position indicator by detecting a driving voltage supplied to said controller and outputting an output signal corresponding to the detected driving voltage;

transmitting the voltage status to the position detector device;

providing a switch between the charging capacitor and said controller, said switch configured to perform energization control in response to said output signal determined at said detecting step.

29. The method according to claim 28, further comprising the step of charging the capacitor by supplying power from the power supply, wherein the charged voltage of said charging capacitor is supplied as the predetermined driving voltage to said controller by the energization control of said switch.

30. The method according to claim 28, further comprising charging the capacitor based at least in part on the voltage status.

31. The method according to claim 28, further comprising generating a user notification based at least in part on the voltage status.

32. The method according to claim 28, further comprising providing as the power supply a magnetic field generation unit and providing a coil with the charging circuit.

33. The method according to claim 28, further comprising providing a controller and wherein the voltage status of the position indicator comprises a voltage status of the controller.

34. The method according to claim 28, wherein the voltage status of the position indicator comprises a voltage status of the capacitor.

* * * * *